(12) United States Patent
Chen et al.

(10) Patent No.: US 12,519,948 B2
(45) Date of Patent: Jan. 6, 2026

(54) INTER PREDICTION METHOD AND APPARATUS

(71) Applicant: HUAWEI TECHNOLOGIES CO., LTD., Guangdong (CN)

(72) Inventors: Huanbang Chen, Shenzhen (CN); Haitao Yang, Shenzhen (CN); Lian Zhang, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 18/882,668

(22) Filed: Sep. 11, 2024

(65) Prior Publication Data

US 2025/0080748 A1 Mar. 6, 2025

Related U.S. Application Data

(63) Continuation of application No. 17/529,106, filed on Nov. 17, 2021, now Pat. No. 12,108,046, which is a (Continued)

(30) Foreign Application Priority Data

May 17, 2019 (CN) .......................... 201910414914.5

(51) Int. Cl.
*H04N 19/137* (2014.01)
*H04N 19/105* (2014.01)
(Continued)

(52) U.S. Cl.
CPC ......... *H04N 19/137* (2014.11); *H04N 19/105* (2014.11); *H04N 19/159* (2014.11); *H04N 19/176* (2014.11)

(58) Field of Classification Search
None
See application file for complete search history.

(56) References Cited

U.S. PATENT DOCUMENTS

2015/0256828 A1 9/2015 Dong et al.
2016/0219278 A1* 7/2016 Chen ...................... H04N 19/52
(Continued)

FOREIGN PATENT DOCUMENTS

CN 102917197 A 2/2013
CN 109587479 A 4/2019
(Continued)

OTHER PUBLICATIONS

Li Zhang et al , "CE2-related: Early awareness of accessing temporal blocks in sub-block merge listconstruction", Bytedance Inc., Joint Video Experts Team (JVET) of ITU-T SG 16 WP 3 and ISO/IEC JTC 1/SC 29/WG 11, Document: JVET-M0273, 13th Meeting: Marrakech, MA, Jan. 9-18, 2019, total 4 pages.

(Continued)

*Primary Examiner* — Rebecca A Volentine

(57) ABSTRACT

This application discloses an inter prediction method, where a to-be-processed block includes one or more subblocks, and the method includes: determining a temporal offset vector of the to-be-processed block based on a spatially neighboring block of the to-be-processed block, where the temporal offset vector is used to determine a collocated subblock of the subblock of the to-be-processed block; and determining a motion vector of the subblock of the to-be-processed block based on a motion vector of the collocated subblock, where the motion vector of the subblock of the to-be-processed block is obtained based on a first preset motion vector when the motion vector of the collocated subblock is unavailable. This application can improve prediction accuracy in coding and increase coding efficiency.

18 Claims, 9 Drawing Sheets

Related U.S. Application Data continuation of application No. PCT/CN2019/100751, filed on Aug. 15, 2019.

(51) Int. Cl.
*H04N 19/159* (2014.01)
*H04N 19/176* (2014.01)

(56) References Cited

U.S. PATENT DOCUMENTS

2019/0174136 A1 6/2019 Jun et al.
2021/0185338 A1 6/2021 Xiu et al.

FOREIGN PATENT DOCUMENTS

| JP | 2018506908 A | 3/2018 |
| JP | 2021502038 A | 1/2021 |
| TW | 201701671 A | 1/2017 |
| WO | 2016123081 A1 | 8/2016 |
| WO | 2017138352 A1 | 8/2017 |
| WO | 2019089933 A1 | 5/2019 |

OTHER PUBLICATIONS

Benjamin Bross et al: "Versatile Video Coding (Draft 5)", 14. JVET Meeting; Mar. 19, 2019 Mar. 27, 2019; Geneva; (The Joint Video Exploration Team of ISO/IEC JTC1/SC29/WG11 and ITU-T SG. 16) No. JVET-N1001 Apr. 12, 2019 (Apr. 12, 2019), pp. 1-360, XP030205171,total 360 pages.

E. Okubo, et al., 5. 5 B-picture in H.264/AVC, Revised Third Edition H.264/AVC Textbook 1st Edition H.264/AVC Textbook, Impress RandD Corporation, Jan. 1, 2009, pp. 125-131.(with the English Abstract).

Document: JVET-M0273, Li Zhang et al, CE2-related: Early awareness of accessing temporal blocks in sub-block Merge list construction, Joint Video Experts Team (JVET) of ITU-T SG 1fi WP 3 and ISO/IECJTC 1/SC 291WG11, 13th eetinw Marrakerh MA Jan. 9-18, 2019, 4 pages, XP030200427.

Jianle Chen et al, Algorithm description for Versatile Video Coding and Test Model 4 (VTM 4), Joint Video Experts Team (JVET) of ITU-T SG 16 WP 3 and ISO/IEC JTC I/SC 291WG11 13th Meeting: Marrakech, MA, Jan. 9-18, 2019,62 pages, XP030215567.

Jian-Liang Lin et al, Motion Vector Coding in the HEVC Standard, IEEE Journal of Selected Topics in Ignal Processing, vol. 7, No. 6, Dec. 2013, total 12 pages.

ITU-T H_261 (Mar. 1993), Line Transmission of Non-Telephone Signals, Video Codec for Audiovisual Services at px 64 kbits, total 29 pages.

Shinobu Kudo et al, Motion Vector Prediction Methods Considering Prediction Continuity in HEVC, 2016 Picture Coding Symposium (PCS), Computer Science, total 5 pages.

ITU-T H.263(Jan. 2005), Series H: Audiovisual and Multimedia Systems, Infrastructure of audiovisual services—Coding of moving video, Video coding for low bit rate communication, total 226 pages.

ITU-T H.264(Apr. 2017) Series H: Audiovisual and Multimedia Systems, Infrastructure of audiovisual services—Coding of moving video, Advanced video coding for generic audiovisual services, total 812 pages.

ITU-T H.265(Feb. 2018) Series H: Audiovisual and Multimedia Systems Infrastructure of audiovisual services—Coding of moving video, High efficiency video coding, total 692 pages.

Document: JVET-N1001-v3, Benjamin Bross et al, Versatile Video Coding (Draft 5), Joint Video Experts Team (JVET) of ITU-T SG 16 WP 3 and ISO/IEC JTC 1/SC 29/WG 11, 14th Meeting: Genera, CH Mar. 19-27, 2019, total 371 pages.

\* cited by examiner

INTER PREDICTION METHOD AND APPARATUS

CROSS-REFERENCE TO RELATED APPLICATIONS

This application is a continuation of U.S. patent application Ser. No. 17/529,106, filed on Nov. 17, 2021, which is a continuation of International Application No. PCT/CN2019/100751, filed on Aug. 15, 2019, which claims priority to Chinese Patent Application No. 201910414914.5, filed on May 17, 2019. All of the afore-mentioned patent applications are hereby incorporated by reference in their entireties.

TECHNICAL FIELD

The present disclosure relates to the video coding field, and in particular, to an inter prediction method and apparatus for a video picture.

BACKGROUND

Digital video capabilities can be incorporated into a wide variety of apparatuses, including digital televisions, digital live broadcast systems, wireless broadcast systems, personal digital assistants (PDAs), laptop or desktop computers, tablet computers, e-book readers, digital cameras, digital recording apparatuses, digital media players, video game apparatuses, video game consoles, cellular or satellite radio phones (so-called "smartphones"), video conferencing apparatuses, video streaming apparatuses, and the like. Digital video apparatuses implement video compression technologies, for example, video compression technologies described in standards defined by MPEG-2, MPEG-4, ITU-T H.263, and ITU-T H.264/MPEG-4 Part 10: advanced video coding (AVC), the video coding standard H.265/high efficiency video coding (HEVC) standard, and extensions of such standards. The video apparatuses can more efficiently transmit, receive, encode, decode, and/or store digital video information by implementing such video compression technologies.

The video compression technologies are used to perform spatial (intra-picture) prediction and/or temporal (inter-picture) prediction to reduce or remove inherent redundancy in video sequences. In block-based video coding, a video slice (that is, a video frame or a part of a video frame) may be partitioned into picture blocks, and the picture block may also be referred to as a tree block, a coding unit (CU), and/or a coding node. A picture block in a to-be-intra-coded (I) slice of a picture is coded through spatial prediction based on a reference sample in a neighboring block in the same picture. A picture block in a to-be-inter-coded (P or B) slice of a picture may be coded through spatial prediction based on a reference sample in a neighboring block in the same picture or temporal prediction based on a reference sample in another reference picture may be used. The picture may be referred to as a frame, and the reference picture may be referred to as a reference frame.

SUMMARY

Embodiments of this application provide an inter prediction method and apparatus for a video picture, and a corresponding encoder and decoder, to reduce implementation complexity while improving accuracy of predicting motion information of a picture block.

According to a first aspect, an embodiment of this application provides an inter prediction method, where a to-be-processed block includes one or more subblocks, and the method includes: determining a temporal offset vector of the to-be-processed block based on a spatially neighboring block of the to-be-processed block, where the temporal offset vector is used to determine a collocated subblock of the subblock of the to-be-processed block; and determining a motion vector of the subblock of the to-be-processed block based on a motion vector of the collocated subblock, where the motion vector of the subblock of the to-be-processed block is obtained based on a first preset motion vector when the motion vector of the collocated subblock is unavailable.

In this implementation, a motion vector is obtained on a basis of the subblock. This improves accuracy of motion vector prediction and increases coding efficiency. In addition, the motion vector of the subblock is obtained based on a preset motion vector when the motion vector of the collocated subblock is unavailable. In comparison with a method for deriving a default motion vector, this implementation reduces implementation complexity.

In an implementation, the determining a temporal offset vector of the to-be-processed block based on a spatially neighboring block of the to-be-processed block includes: sequentially checking, in a preset order, whether motion vectors of spatially neighboring blocks at a plurality of first preset positions are available, until a motion vector of a first spatially neighboring block whose motion vector is available in the preset order is obtained; and using, as the temporal offset vector, the motion vector of the first spatially neighboring block whose motion vector is available in the preset order.

In this implementation, the temporal offset vector is obtained by using a plurality of spatially neighboring blocks. In this way, spatial correlation of prediction objects is fully utilized.

In an implementation, a second preset motion vector is used as the temporal offset vector when the motion vectors of the spatially neighboring blocks at the plurality of first preset positions are all unavailable.

In an implementation, the second preset motion vector is a zero motion vector.

In this implementation, the zero motion vector is used as an alternative solution when the motion vectors of the spatially neighboring blocks at the plurality of preset positions are unavailable. This reduces implementation complexity.

In an implementation, the determining a temporal offset vector of the to-be-processed block based on a spatially neighboring block of the to-be-processed block includes: obtaining a motion vector and a reference frame of a spatially neighboring block at a second preset position, where the motion vector of the spatially neighboring block at the second preset position is available; and using the motion vector of the spatially neighboring block at the second preset position as the temporal offset vector.

In this implementation, the temporal offset vector is obtained by using the spatially neighboring block at the preset position. This skips the checking step in the foregoing embodiment, and further reduces implementation complexity.

In an implementation, a third preset motion vector is used as the temporal offset vector when the motion vector of the spatially neighboring block at the second preset position is unavailable.

In an implementation, the third preset motion vector is a zero motion vector.

In this implementation, the zero motion vector is used as an alternative solution when the motion vector of the spatially neighboring block at the preset position is unavailable. This reduces implementation complexity.

In an implementation, the motion vector of the spatially neighboring block at the second preset position includes a first direction motion vector that is based on a first reference frame list, and the reference frame of the spatially neighboring block at the second preset position includes a first direction reference frame corresponding to the first direction motion vector; and the using the motion vector of the spatially neighboring block at the second preset position as the temporal offset vector includes: using the first direction motion vector as the temporal offset vector when the first direction reference frame is the same as an image frame in which the collocated subblock is located.

In an implementation, when the first direction reference frame is different from the image frame in which the collocated subblock is located, the method includes: using the third preset motion vector as the temporal offset vector.

In an implementation, when bidirectional prediction is used for the spatially neighboring block at the second preset position, the motion vector of the spatially neighboring block at the second preset position further includes a second direction motion vector that is based on a second reference frame list, and the reference frame of the spatially neighboring block at the second preset position includes a second direction reference frame corresponding to the second direction motion vector; and when the first direction reference frame is different from the image frame in which a corresponding temporal block of the to-be-processed block is located, the method includes: using the second direction motion vector as the temporal offset vector when the second direction reference frame is the same as the image frame in which the collocated subblock is located, or using the third preset motion vector as the temporal offset vector when the second direction reference frame is different from the image frame in which the collocated subblock is located.

In an implementation, when bidirectional prediction is used for the spatially neighboring block at the second preset position, the motion vector of the spatially neighboring block at the second preset position includes a first direction motion vector that is based on a first reference frame list and a second direction motion vector that is based on a second reference frame list, and the reference frame of the spatially neighboring block at the second preset position includes a first direction reference frame corresponding to the first direction motion vector and a second direction reference frame corresponding to the second direction motion vector; and the using the motion vector of the spatially neighboring block at the second preset position as the temporal offset vector includes: when an image frame in which the collocated subblock is located is obtained from the second reference frame list, using the second direction motion vector as the temporal offset vector when the second direction reference frame is the same as the image frame in which the collocated subblock is located, or using the first direction motion vector as the temporal offset vector when the second direction reference frame is different from the image frame in which the collocated subblock is located and the first direction reference frame is the same as the image frame in which the collocated subblock is located; or when an image frame in which the collocated subblock is located is obtained from the first reference frame list, using the first direction motion vector as the temporal offset vector when the first direction reference frame is the same as the image frame in which the collocated subblock is located, or using the second direction motion vector as the temporal offset vector when the first direction reference frame is different from the image frame in which the collocated subblock is located and the second direction reference frame is the same as the image frame in which the collocated subblock is located.

In an implementation, the using the motion vector of the spatially neighboring block at the second preset position as the temporal offset vector includes: when the image frame in which the collocated subblock is located is obtained from the second reference frame list, and all reference frames in a reference frame list of the to-be-processed block are displayed before an image frame in which the to-be-processed block is located, using the second direction motion vector as the temporal offset vector when the second direction reference frame is the same as the image frame in which the collocated subblock is located, or using the first direction motion vector as the temporal offset vector when the second direction reference frame is different from the image frame in which the collocated subblock is located and the first direction reference frame is the same as the image frame in which the collocated subblock is located; or when the image frame in which the collocated subblock is located is obtained from the first reference frame list, or at least one reference frame in a reference frame list of the to-be-processed block is displayed after an image frame in which the to-be-processed block is located, using the first direction motion vector as the temporal offset vector when the first direction reference frame is the same as the image frame in which the collocated subblock is located, or using the second direction motion vector as the temporal offset vector when the first direction reference frame is different from the image frame in which the collocated subblock is located and the second direction reference frame is the same as the image frame in which the collocated subblock is located.

In an implementation, the third preset motion vector is used as the temporal offset vector when the second direction reference frame is different from the image frame in which the collocated subblock is located and the first direction reference frame is different from the image frame in which the collocated subblock is located.

The foregoing implementations are different methods for obtaining the temporal offset vector, and have different performance and implementation complexities. An implementation may be selected based on an implementation complexity requirement.

In an implementation, an index that is of the image frame in which the collocated subblock is located and that is in a reference frame list of the spatially neighboring block of the to-be-processed block is obtained by parsing a bitstream.

In this implementation, there are a plurality of possibilities for selecting the image frame in which the collocated subblock is located. This improves coding performance.

In an implementation, a condition that the motion vector of the spatially neighboring block is unavailable includes one or a combination of the following items: the spatially neighboring block is not encoded/decoded; an intra prediction mode or an intra block copy mode is used for the spatially neighboring block; the spatially neighboring block does not exist; or the spatially neighboring block and the to-be-processed block are located in different coding regions.

In an implementation, the coding region includes a picture, a slice, a tile, or a tile group.

In an implementation, before the determining a motion vector of the subblock of the to-be-processed block, the method further includes: determining whether a motion vector corresponding to a preset intra-block position of the collocated subblock is available; and correspondingly, the determining a motion vector of the subblock of the to-be-processed block includes: obtaining the motion vector of the subblock of the to-be-processed block based on the motion vector corresponding to the preset intra-block position when the motion vector corresponding to the preset intra-block position is available, or obtaining the motion vector of the subblock of the to-be-processed block based on the first preset motion vector when the motion vector corresponding to the preset intra-block position is unavailable.

In an implementation, the preset intra-block position is a geometric center position of the collocated subblock.

In this implementation, the geometric center position is used as the preset intra-block position, or another intra-block position such as a top-left corner of the collocated subblock may be used as the preset intra-block position.

In an implementation, when the intra prediction mode or the intra block copy mode is used for a prediction unit in which the preset intra-block position is located, the motion vector corresponding to the preset intra-block position is unavailable; or when inter prediction is used for a prediction unit in which the preset intra-block position is located, the motion vector corresponding to the preset intra-block position is available.

In this implementation, a prediction mode is used to determine whether the motion vector of the collocated subblock is available. This further reduces implementation complexity.

In an implementation, that the motion vector of the subblock of the to-be-processed block is obtained based on a first preset motion vector includes: using the first preset motion vector as the motion vector of the subblock of the to-be-processed block.

In an implementation, the first preset motion vector is a zero motion vector.

In this implementation, when the motion vector of the collocated subblock is unavailable, the zero motion vector is used as an alternative solution of the motion vector of the subblock of the to-be-processed block. This further reduces implementation complexity.

In an implementation, the motion vector of the subblock includes a first direction subblock motion vector that is based on the first reference frame list and/or a second direction subblock motion vector that is based on the second reference frame list; and when the motion vector corresponding to the preset intra-block position is unavailable, that the motion vector of the subblock of the to-be-processed block is obtained based on the first preset motion vector includes: determining that unidirectional prediction based on the first direction subblock motion vector is used for the subblock of the to-be-processed block, and obtaining the first direction subblock motion vector of the subblock of the to-be-processed block based on the first preset motion vector; or determining that unidirectional prediction based on the second direction subblock motion vector is used for the subblock of the to-be-processed block, and obtaining the second direction subblock motion vector of the subblock of the to-be-processed block based on the first preset motion vector.

In an implementation, when the motion vector corresponding to the preset intra-block position is unavailable, that the motion vector of the subblock of the to-be-processed block is obtained based on a first preset motion vector includes: when a prediction type of a coding region in which the to-be-processed block is located is B type prediction, determining that bidirectional prediction is used for the subblock of the to-be-processed block, and separately obtaining the first direction subblock motion vector of the subblock of the to-be-processed block and the second direction subblock motion vector of the subblock of the to-be-processed block based on the first preset motion vector; or when a prediction type of a coding region in which the to-be-processed block is located is P type prediction, determining that unidirectional prediction is used for the subblock of the to-be-processed block, and obtaining the first direction subblock motion vector of the subblock of the to-be-processed block based on the first preset motion vector.

It should be understood that the prediction type of the coding region in which the to-be-processed block is B type prediction means that the region in which the to-be-processed block is located is a B type region. For example, the to-be-processed block is located in a B frame, a B slice, a B tile, a B tile group, or the like. In this case, both bidirectional prediction and unidirectional prediction are allowed for the to-be-processed block. That the prediction type of the coding region in which the to-be-processed block is located is P type prediction means that the region in which the to-be-processed block is located is a P type region. For example, the to-be-processed block is located in a P frame, a P slice, a P tile, a P tile group, or the like. In this case, only unidirectional prediction is allowed for the to-be-processed block.

The foregoing implementations are different methods for obtaining the subblock of the to-be-processed block based on the motion vector of the collocated subblock, and have different performance and implementation complexities. An implementation may be selected based on an implementation complexity requirement.

In an implementation, the obtaining the motion vector of the subblock of the to-be-processed block based on the motion vector corresponding to the preset intra-block position includes: performing, based on a ratio of a first temporal distance difference to a second temporal distance difference, scaling processing on the motion vector corresponding to the preset intra-block position, to obtain the motion vector of the subblock of the to-be-processed block, where the first temporal distance difference is a picture order count difference between the image frame in which the to-be-processed block is located and a reference frame of the to-be-processed block, and the second temporal distance difference is a picture order count difference between the image frame in which the collocated subblock is located and a reference frame of the collocated subblock.

In an implementation, an index of the reference frame of the to-be-processed block in the reference frame list of the to-be-processed block is obtained by parsing the bitstream.

In this implementation, there are a plurality of possibilities for selecting the reference frame. This improves coding performance.

In an implementation, the index of the reference frame of the to-be-processed block in the reference frame list of the to-be-processed block is 0.

When a value of the index is a value agreed on by an encoder side and a decoder side according to a protocol, a bit rate for transmitting related information is reduced.

In an implementation, the method further includes: performing motion compensation on the subblock of the to-be-processed block based on the motion vector of the subblock of the to-be-processed block and the reference frame of the to-be-processed block, to obtain a prediction value of the subblock of the to-be-processed block.

This prediction mode may be used as one of a plurality of possible inter prediction modes, may be used in construction of a candidate prediction vector list, and may be combined with another prediction mode such as a merge (merge) mode or an affine (affine) prediction mode, to implement reconstruction of the to-be-processed block.

According to a second aspect, an embodiment of this application provides an inter prediction apparatus, where a to-be-processed block includes one or more subblocks, and the apparatus includes: an offset obtaining module, configured to determine a temporal offset vector of the to-be-processed block based on a spatially neighboring block of the to-be-processed block, where the temporal offset vector is used to determine a collocated subblock of the subblock of the to-be-processed block; and a motion vector obtaining module, configured to determine a motion vector of the subblock of the to-be-processed block based on a motion vector of the collocated subblock, where the motion vector of the subblock of the to-be-processed block is obtained based on a first preset motion vector when the motion vector of the collocated subblock is unavailable.

In an embodiment, the offset obtaining module is configured to: sequentially check, in a preset order, whether motion vectors of spatially neighboring blocks at a plurality of first preset positions are available, until a motion vector of a first spatially neighboring block whose motion vector is available in the preset order is obtained; and use, as the first temporal offset vector, the motion vector of the first spatially neighboring block whose motion vector is available in the preset order.

In an implementation, the offset obtaining module is configured to use a second preset motion vector as the temporal offset vector when the motion vectors of the spatially neighboring blocks at the plurality of first preset positions are all unavailable.

In an implementation, the second preset motion vector is a zero motion vector.

In an implementation, the offset obtaining module is configured to: obtain a motion vector and a reference frame of a spatially neighboring block at a second preset position, where the motion vector of the spatially neighboring block at the second preset position is available; and use the motion vector of the spatially neighboring block at the second preset position as the temporal offset vector.

In an implementation, the offset obtaining module is configured to use a third preset motion vector as the temporal offset vector when the motion vector of the spatially neighboring block at the second preset position is unavailable.

In an implementation, the third preset motion vector is a zero motion vector.

In an implementation, the motion vector of the spatially neighboring block at the second preset position includes a first direction motion vector that is based on a first reference frame list, and the reference frame of the spatially neighboring block at the second preset position includes a first direction reference frame corresponding to the first direction motion vector; and the offset obtaining module is configured to use the first direction motion vector as the temporal offset vector when the first direction reference frame is the same as an image frame in which the collocated subblock is located.

In an implementation, when the first direction reference frame is different from the image frame in which the collocated subblock is located, the offset obtaining module is configured to use the third preset motion vector as the temporal offset vector.

In an implementation, when bidirectional prediction is used for the spatially neighboring block at the second preset position, the motion vector of the spatially neighboring block at the second preset position further includes a second direction motion vector that is based on a second reference frame list, and the reference frame of the spatially neighboring block at the second preset position includes a second direction reference frame corresponding to the second direction motion vector; and when the first direction reference frame is different from the image frame in which a corresponding temporal block of the to-be-processed block is located, the offset obtaining module is configured to: use the second direction motion vector as the temporal offset vector when the second direction reference frame is the same as the image frame in which the collocated subblock is located, or use the third preset motion vector as the temporal offset vector when the second direction reference frame is different from the image frame in which the collocated subblock is located.

In an implementation, when bidirectional prediction is used for the spatially neighboring block at the second preset position, the motion vector of the spatially neighboring block at the second preset position includes a first direction motion vector that is based on a first reference frame list and a second direction motion vector that is based on a second reference frame list, and the reference frame of the spatially neighboring block at the second preset position includes a first direction reference frame corresponding to the first direction motion vector and a second direction reference frame corresponding to the second direction motion vector; and the offset obtaining module is configured to: when an image frame in which the collocated subblock is located is obtained from the second reference frame list, use the second direction motion vector as the temporal offset vector when the second direction reference frame is the same as the image frame in which the collocated subblock is located, or use the first direction motion vector as the temporal offset vector when the second direction reference frame is different from the image frame in which the collocated subblock is located and the first direction reference frame is the same as the image frame in which the collocated subblock is located; or when an image frame in which the collocated subblock is located is obtained from the first reference frame list, use the first direction motion vector as the temporal offset vector when the first direction reference frame is the same as the image frame in which the collocated subblock is located, or use the second direction motion vector as the temporal offset vector when the first direction reference frame is different from the image frame in which the collocated subblock is located and the second direction reference frame is the same as the image frame in which the collocated subblock is located.

In an implementation, the offset obtaining module is configured to: when the image frame in which the collocated subblock is located is obtained from the second reference frame list, and all reference frames in a reference frame list of the to-be-processed block are displayed before an image frame in which the to-be-processed block is located, use the second direction motion vector as the temporal offset vector when the second direction reference frame is the same as the image frame in which the collocated subblock is located, or use the first direction motion vector as the temporal offset vector when the second direction reference frame is different from the image frame in which the collocated subblock is located and the first direction reference frame is the same as the image frame in which the collocated subblock is located; or when the image frame in which the collocated subblock is located is obtained from the first reference frame list, or at least one reference frame in a reference frame list of the to-be-processed block is displayed after an image frame in which the to-be-processed block is located, use the first direction motion vector as the temporal offset vector when the first direction reference frame is the same as the image frame in which the collocated subblock is located, or use the second direction motion vector as the temporal offset vector when the first direction reference frame is different from the image frame in which the collocated subblock is located and the second direction reference frame is the same as the image frame in which the collocated subblock is located.

In an implementation, the offset obtaining module is configured to use the third preset motion vector as the temporal offset vector when the second direction reference frame is different from the image frame in which the collocated subblock is located and the first direction reference frame is different from the image frame in which the collocated subblock is located.

In an implementation, an index that is of the image frame in which the collocated subblock is located and that is in a reference frame list of the spatially neighboring block of the to-be-processed block is obtained by parsing a bitstream.

In an implementation, a condition that the motion vector of the spatially neighboring block is unavailable includes one or a combination of the following items: The spatially neighboring block is not encoded/decoded; an intra prediction mode or an intra block copy mode is used for the spatially neighboring block; the spatially neighboring block does not exist; or the spatially neighboring block and the to-be-processed block are located in different coding regions.

In an implementation, the coding region includes a picture, a slice, a tile, or a tile group.

In an implementation, the apparatus further includes: a determining module, configured to determine whether a motion vector corresponding to a preset intra-block position of the collocated subblock is available; and correspondingly, the motion vector obtaining module is configured to: obtain the motion vector of the subblock of the to-be-processed block based on the motion vector corresponding to the preset intra-block position when the motion vector corresponding to the preset intra-block position is available, or obtain the motion vector of the subblock of the to-be-processed block based on the first preset motion vector when the motion vector corresponding to the preset intra-block position is unavailable.

In an implementation, the preset intra-block position is a geometric center position of the collocated subblock.

In an implementation, when the intra prediction mode or the intra block copy mode is used for a prediction unit in which the preset intra-block position is located, the motion vector corresponding to the preset intra-block position is unavailable; or when inter prediction is used for a prediction unit in which the preset intra-block position is located, the motion vector corresponding to the preset intra-block position is available.

In an implementation, the motion vector obtaining module is configured to use the first preset motion vector as the motion vector of the subblock of the to-be-processed block.

In an implementation, the first preset motion vector is a zero motion vector.

In an implementation, the motion vector of the subblock includes a first direction subblock motion vector that is based on the first reference frame list and/or a second direction subblock motion vector that is based on the second reference frame list; and when the motion vector corresponding to the preset intra-block position is unavailable, the motion vector obtaining module is configured to: determine that unidirectional prediction based on the first direction subblock motion vector is used for the subblock of the to-be-processed block, and obtain the first direction subblock motion vector of the subblock of the to-be-processed block based on the first preset motion vector; or determine that unidirectional prediction based on the second direction subblock motion vector is used for the subblock of the to-be-processed block, and obtain the second direction subblock motion vector of the subblock of the to-be-processed block based on the first preset motion vector.

In an implementation, when the motion vector corresponding to the preset intra-block position is unavailable, the motion vector obtaining module is configured to: when a prediction type of a coding region in which the to-be-processed block is located is B type prediction, determine that bidirectional prediction is used for the subblock of the to-be-processed block, and separately obtain the first direction subblock motion vector of the subblock of the to-be-processed block and the second direction subblock motion vector of the subblock of the to-be-processed block based on the first preset motion vector; or when a prediction type of a coding region in which the to-be-processed block is located is P type prediction, determine that unidirectional prediction is used for the subblock of the to-be-processed block, and obtain the first direction subblock motion vector of the subblock of the to-be-processed block based on the first preset motion vector.

In an implementation, the motion vector obtaining module is configured to perform, based on a ratio of a first temporal distance difference to a second temporal distance difference, scaling processing on the motion vector corresponding to the preset intra-block position, to obtain the motion vector of the subblock of the to-be-processed block, where the first temporal distance difference is a picture order count difference between the image frame in which the to-be-processed block is located and a reference frame of the to-be-processed block, and the second temporal distance difference is a picture order count difference between the image frame in which the collocated subblock is located and a reference frame of the collocated subblock.

In an implementation, an index of the reference frame of the to-be-processed block in the reference frame list of the to-be-processed block is obtained by parsing the bitstream.

In an implementation, the index of the reference frame of the to-be-processed block in the reference frame list of the to-be-processed block is 0.

In an implementation, the apparatus further includes: a motion compensation module, configured to perform motion compensation on the subblock of the to-be-processed block based on the motion vector of the subblock of the to-be-processed block and the reference frame of the to-be-processed block, to obtain a prediction value of the subblock of the to-be-processed block.

According to a third aspect, an embodiment of this application provides a video encoder. The video encoder is configured to encode a picture block, and includes: the inter prediction apparatus according to the second aspect of the embodiments of this application, where the inter prediction apparatus is configured to: predict motion information of a current encoding picture block based on target candidate motion information, and determine a predicted pixel value of the current encoding picture block based on the motion information of the current encoding picture block;

an entropy encoding module, configured to encode an index identifier of the target candidate motion information into a bitstream, where the index identifier indicates the target candidate motion information used for the current encoding picture block; and a reconstruction module, configured to reconstruct the current encoding picture block based on the predicted pixel value.

According to a fourth aspect, an embodiment of this application provides a video decoder. The video decoder is configured to decode a picture block from a bitstream, and includes: an entropy decoding module, configured to decode an index identifier from the bitstream, where the index identifier is used to indicate target candidate motion information of a current decoding picture block; the inter prediction apparatus according to the second aspect of the embodiments of this application, where the inter prediction apparatus is configured to: predict motion information of the current decoding picture block based on the target candidate motion information indicated by the index identifier, and determine a predicted pixel value of the current decoding picture block based on the motion information of the current decoding picture block; and a reconstruction module, configured to reconstruct the current decoding picture block based on the predicted pixel value.

According to a fifth aspect, an embodiment of this application provides an encoding device, including a non-volatile memory and a processor that are coupled to each other. The processor invokes program code stored in the memory, to perform a part or all of steps of any method according to the first aspect.

According to a sixth aspect, an embodiment of this application provides a decoding device, including a non-volatile memory and a processor that are coupled to each other. The processor invokes program code stored in the memory, to perform a part or all of steps of any method according to the first aspect.

According to a seventh aspect, an embodiment of this application provides a computer-readable storage medium. The computer-readable storage medium stores program code, where the program code includes instructions used to perform a part or all of steps of any method according to the first aspect.

According to an eighth aspect, an embodiment of this application provides a computer program product. When the computer program product runs on a computer, the computer is enabled to perform a part or all of steps of any method according to the first aspect.

According to a ninth aspect, an embodiment of this application provides an inter prediction method, where a to-be-processed block includes one or more subblocks, and the method includes: obtaining a spatially neighboring block of the to-be-processed block; and obtaining a temporal offset vector based on the spatially neighboring block, where the temporal offset vector is used to determine a collocated subblock of the subblock of the to-be-processed block, where when the spatially neighboring block has a first direction reference frame located in a first reference frame list, and an image frame in which the collocated subblock is located is the same as the first direction reference frame, the temporal offset vector is a first direction motion vector of the spatially neighboring block, and the first direction motion vector corresponds to the first direction reference frame.

In an implementation, when the spatially neighboring block does not have the first direction reference frame located in the first reference frame list, or the image frame in which the collocated subblock is located is different from the first direction reference frame, the method further includes: when the spatially neighboring block has a second direction reference frame located in a second reference frame list, and the image frame in which the collocated subblock is located is the same as the second direction reference frame, the temporal offset vector is a second direction motion vector of the spatially neighboring block, and the second direction motion vector corresponds to the second direction reference frame.

In an implementation, the obtaining a spatially neighboring block of the to-be-processed block includes: checking whether the spatially neighboring block is available; and obtaining the spatially neighboring block when the spatially neighboring block is available.

In an implementation, that the image frame in which the collocated subblock is located is the same as the first direction reference frame includes: A POC of the image frame in which the collocated subblock is located is the same as a POC of the first direction reference frame.

In an implementation, that the image frame in which the collocated subblock is located is the same as the second direction reference frame includes: the POC of the image frame in which the collocated subblock is located is the same as a POC of the second direction reference frame.

In an implementation, the method further includes: parsing a bitstream to obtain index information of the image frame in which the collocated subblock is located.

In an implementation, the method further includes: using an image frame having a preset relationship with the to-be-processed block as the image frame in which the collocated subblock is located.

In an implementation, the preset relationship includes: the image frame in which the collocated subblock is located is adjacent to an image frame in which the to-be-processed block is located in a decoding order, and is decoded earlier than the image frame in which the to-be-processed block is located.

In an implementation, the preset relationship includes: the image frame in which the collocated subblock is located is a reference frame whose reference frame index is 0 in a first direction reference frame list or a second direction reference frame list of the to-be-processed block.

In an implementation, when the spatially neighboring block does not have the second direction reference frame located in the second reference frame list, or the image frame in which the collocated subblock is located is different from the second direction reference frame, the method further includes: using a zero motion vector as the temporal offset vector.

According to a tenth aspect, an embodiment of this application provides a video coding device, including a non-volatile memory and a processor that are coupled to each other. The processor invokes program code stored in the memory, to perform the method described in the ninth aspect.

It should be understood that, the technical solutions in the second aspect to the tenth aspect of this application are consistent with the technical solution in the first aspect. Beneficial effects achieved in the various aspects and corresponding feasible implementations are similar, and details are not described again.

BRIEF DESCRIPTION OF DRAWINGS

To describe the technical solutions in the embodiments of this application or in the background more clearly, the following briefly describes the accompanying drawings for describing the embodiments of this application or the background.

DESCRIPTION OF EMBODIMENTS

Figure 1A:
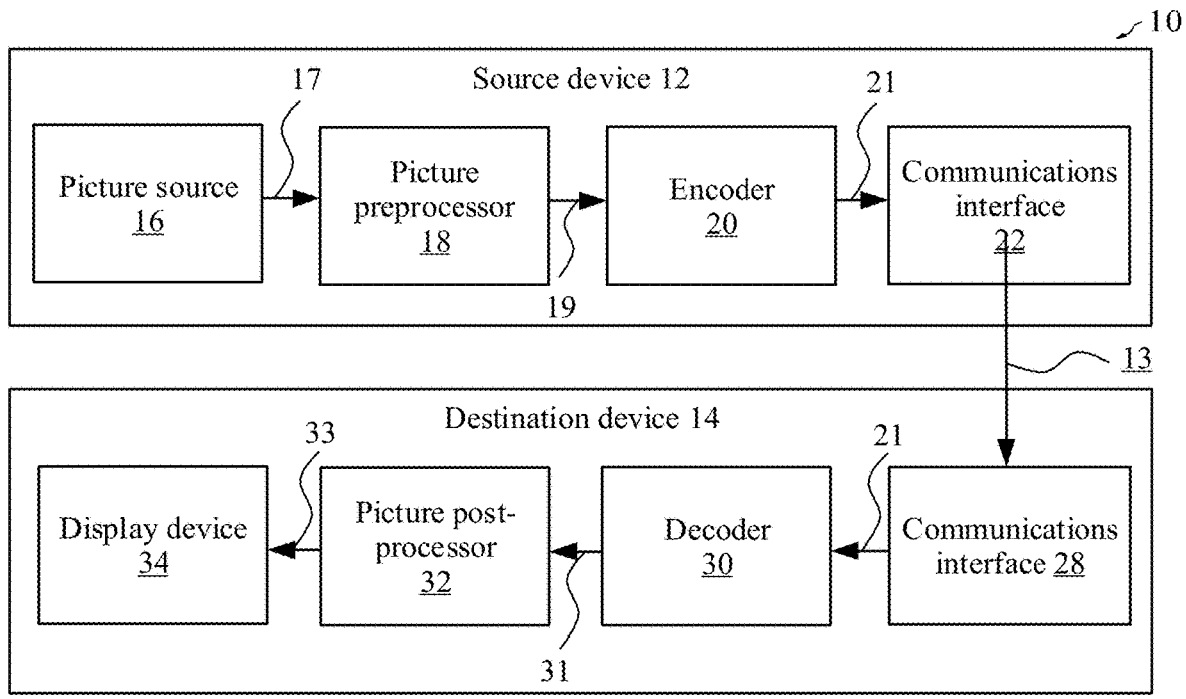
FIG. 1A is a diagram of an example of a video encoding and decoding system 10 for implementing an embodiment of the disclosure.

The following describes the embodiments disclosed herein with reference to the accompanying drawings. In the following description, reference is made to the accompanying drawings that form a part of this disclosure and show, by way of illustration, specific aspects of the embodiments or specific aspects in which the embodiments may be used. It should be understood that the embodiments may be used in other aspects, and may include structural or logical changes not depicted in the accompanying drawings. Therefore, the following detailed description shall not be understood in a limiting sense, and the scope of the disclosure is defined by the appended claims. For example, it should be understood that disclosed content with reference to described methods is also applicable to a corresponding device or system configured to perform the method, and vice versa. For example, if one or more method steps are described, a corresponding device may include one or more units such as functional units for performing the described one or more method steps (for example, one unit performs the one or more steps; or a plurality of units, each of which performs one or more of the plurality of steps), even if such one or more units are not explicitly described or illustrated in the accompanying drawings. In addition, for example, if an apparatus is described based on one or more units such as a functional unit, a corresponding method may include a step used to perform one or more functionalities of one or more units (for example, one step used to perform one or more functionalities of one or more units; or a plurality of steps, each of which is used to perform one or more functionalities of one or more units in a plurality of units), even if such one or more of steps are not explicitly described or illustrated in the accompanying drawings. Further, it should be understood that features of various example embodiments and/or aspects described in this specification may be combined with each other, unless otherwise specified.

The technical solutions in the embodiments may not only be applied to existing video coding standards (for example, standards such as H.264 and HEVC), but also be applied to future video coding standards (for example, the H.266 standard). Terms used in the embodiments are merely intended to explain embodiments and are not intended to limit the disclosure. The following first briefly describes some concepts that may be used in the embodiments.

Video coding typically refers to processing of a sequence of pictures, where the sequence of pictures forms a video or a video sequence. In the video coding field, the terms "picture (picture)", "frame (frame)", and "image (image)" may be used as synonyms. Video coding used in this specification indicates video encoding or video decoding. Video encoding is performed at a source side, and typically includes processing (for example, by compression) an original video picture to reduce an amount of data for representing the video picture, for more efficient storage and/or transmission. Video decoding is performed at a destination side, and typically includes inverse processing in comparison with an encoder to reconstruct the video picture. "Coding" of a video picture in the embodiments should be understood as "encoding" or "decoding" of a video sequence. A combination of an encoding part and a decoding part is also referred to as coding (encoding and decoding).

A video sequence includes a series of pictures (pictures), the picture is further split into slices (slices), and the slice is further split into blocks (blocks). Video coding is performed by block. In some new video coding standards, the concept "block" is further expanded. For example, in the H.264 standard, there is a macroblock (macroblock, MB), and the macroblock may be further split into a plurality of prediction blocks (partitions) that can be used for predictive coding. In the high efficiency video coding (high efficiency video coding, HEVC) standard, a plurality of block units are classified based on functions by using basic concepts such as a coding unit (coding unit, CU), a prediction unit (prediction unit, PU), and a transform unit (transform unit, TU), and are described by using a new tree-based structure. For example, a CU may be split into smaller CUs based on a quadtree, and the smaller CU may be further split, to generate a quadtree structure. The CU is a basic unit for splitting and encoding a coding picture. A PU and a TU also have similar tree structures. The PU may correspond to a prediction block, and is a basic unit for predictive coding. The CU is further split into a plurality of PUs in a split mode. The TU may correspond to a transform block, and is a basic unit for transforming a prediction residual. However, in essence, all of the CU, the PU, and the TU are concepts of blocks (or picture blocks).

For example, in HEVC, a CTU is split into a plurality of CUs by using a quadtree structure represented as a coding tree. A decision on whether to code a picture region by using inter-picture (temporal) or intra-picture (spatial) prediction is made at a CU level. Each CU may be further split into one, two, or four PUs based on a PU split type. In one PU, a same prediction process is applied, and related information is transmitted to a decoder on a PU basis. After a residual block is obtained by applying the prediction process based on the PU split type, the CU may be partitioned into transform units (transform units, TUs) based on another quadtree structure similar to the coding tree used for the CU. In the recent development of video compression technologies, a quadtree plus binary tree (Quadtree plus Binary Tree, QTBT) partition frame is used to partition a coding block. In a QTBT block structure, the CU may be square or rectangular.

In this specification, for ease of description and understanding, a to-be-coded picture block in a current coding picture may be referred to as a current block. For example, in encoding, the current block is a block that is being encoded, and in decoding, the current block is a block that is being decoded. A decoded picture block, in a reference picture, used to predict the current block is referred to as a reference block. The reference block is a block that provides a reference signal for the current block, and the reference signal represents a pixel value in the picture block. A block that is in the reference picture and that provides a prediction signal for the current block may be referred to as a prediction block. The prediction signal represents a pixel value, a sampling value, or a sampling signal in the prediction block. For example, after a plurality of reference blocks are traversed, an optimal reference block is found. The optimal reference block provides prediction for the current block, and this block is referred to as a prediction block.

In a case of lossless video coding, an original video picture can be reconstructed, that is, a reconstructed video picture has same quality as the original video picture (assuming that no transmission loss or other data loss occurs during storage or transmission). In a case of lossy video coding, further compression is performed through, for example, quantization, to reduce an amount of data required for representing a video picture, and the video picture cannot be completely reconstructed on a decoder side, that is, quality of a reconstructed video picture is lower or poorer than quality of the original video picture.

Several H.261 video coding standards are used for "lossy hybrid video codecs" (that is, spatial and temporal prediction in a sample domain is combined with 2D transform coding for applying quantization in a transform domain). Each picture of a video sequence is usually partitioned into a set of non-overlapping blocks, and coding is usually performed at a block level. In other words, on an encoder side, a video is usually processed, that is, encoded, at a block (video block) level. For example, a prediction block is generated through spatial (intra-picture) prediction and temporal (inter-picture) prediction, the prediction block is subtracted from a current block (a block that is currently being processed or to be processed) to obtain a residual block, and the residual block is transformed in the transform domain and quantized to reduce an amount of data that is to be transmitted (compressed). On a decoder side, an inverse processing part relative to the encoder is applied to the encoded or compressed block to reconstruct the current block for representation. Furthermore, the encoder duplicates a processing loop of the decoder, so that the encoder and the decoder generate identical prediction (for example, intra prediction and inter prediction) and/or reconstruction for processing, that is, coding, a subsequent block.

The following describes a system architecture to which the embodiments are applied. FIG. 1A is a diagram of an example of a video encoding and decoding system 10 to which an embodiment is applied. As shown in FIG. 1A, the video encoding and decoding system 10 may include a source device 12 and a destination device 14. The source device 12 generates encoded video data, and therefore the source device 12 may be referred to as a video encoding apparatus. The destination device 14 may decode the encoded video data generated by the source device 12, and therefore the destination device 14 may be referred to as a video decoding apparatus. In various implementation solutions, the source device 12, the destination device 14, or both the source device 12 and the destination device 14 may include one or more processors and a memory coupled to the one or more processors. The memory may include but is not limited to a RAM, a ROM, an EEPROM, a flash memory, or any other medium that can be used to store desired program code in a form of an instruction or a data structure accessible by a computer, as described in this specification. The source device 12 and the destination device 14 may include various apparatuses, including a desktop computer, a mobile computing apparatus, a notebook (for example, a laptop) computer, a tablet computer, a set-top box, a telephone handset such as a so-called "smart" phone, a television, a camera, a display apparatus, a digital media player, a video game console, a vehicle-mounted computer, a wireless communications device, or the like.

Although FIG. 1A depicts the source device 12 and the destination device 14 as separate devices, a device embodiment may alternatively include both the source device 12 and the destination device 14 or functionalities of both the source device 12 and the destination device 14, that is, the source device 12 or a corresponding functionality and the destination device 14 or a corresponding functionality. In such an embodiment, the source device 12 or the corresponding functionality and the destination device 14 or the corresponding functionality may be implemented by using same hardware and/or software, separate hardware and/or software, or any combination thereof.

A communication connection between the source device 12 and the destination device 14 may be implemented through a link 13, and the destination device 14 may receive the encoded video data from the source device 12 through the link 13. The link 13 may include one or more media or apparatuses capable of moving the encoded video data from the source device 12 to the destination device 14. In an example, the link 13 may include one or more communications media that enable the source device 12 to directly transmit the encoded video data to the destination device 14 in real time. In this example, the source device 12 may modulate the encoded video data according to a communications standard (for example, a wireless communications protocol), and may transmit modulated video data to the destination device 14. The one or more communications media may include a wireless communications medium and/or a wired communications medium, for example, a radio frequency (RF) spectrum or one or more physical transmission cables. The one or more communications media may constitute a part of a packet-based network, and the packet-based network is, for example, a local area network, a wide area network, or a global network (for example, the internet). The one or more communications media may include a router, a switch, a base station, or another device that facilitates communication from the source device 12 to the destination device 14.

The source device 12 includes an encoder 20. Optionally, the source device 12 may further include a picture source 16, a picture preprocessor 18, and a communications interface 22. In an implementation, the encoder 20, the picture source 16, the picture preprocessor 18, and the communications interface 22 may be hardware components in the source device 12, or may be software programs in the source device 12. Descriptions are separately provided as follows.

The picture source 16 may include or be any type of picture capturing device configured to, for example, capture a real-world picture; and/or any type of device for generating a picture or comment (for screen content coding, some text on a screen is also considered as a part of a to-be-coded picture or image), for example, a computer graphics processing unit configured to generate a computer animation picture; or any type of device configured to obtain and/or provide a real-world picture or a computer animation picture (for example, screen content or a virtual reality (virtual reality, VR) picture), and/or any combination thereof (for example, an augmented reality (augmented reality, AR) picture). The picture source 16 may be a camera configured to capture a picture or a memory configured to store a picture. The picture source 16 may further include any type of (internal or external) interface through which a previously captured or generated picture is stored and/or a picture is obtained or received. When the picture source 16 is a camera, the picture source 16 may be, for example, a local camera or a camera integrated into the source device. When the picture source 16 is a memory, the picture source 16 may be a local memory or, for example, a memory integrated into the source device. When the picture source 16 includes an interface, the interface may be, for example, an external interface for receiving a picture from an external video source. The external video source is, for example, an external picture capturing device such as a camera, an external memory, or an external picture generation device. The external picture generation device is, for example, an external computer graphics processing unit, a computer, or a server. The interface may be any type of interface, for example, a wired or wireless interface or an optical interface, according to any proprietary or standardized interface protocol.

A picture may be considered as a two-dimensional array or matrix of pixels (picture elements). The pixel in the array may also be referred to as a sample. A quantity of samples in horizontal and vertical directions (or axes) of the array or the picture defines a size and/or a resolution of the picture. For representation of a color, three color components are usually used. For example, the picture may be represented as or include three sample arrays. For example, in an RBG format or color space, the picture includes corresponding red, green, and blue sample arrays. However, in video coding, each pixel is usually represented in a luma/chroma format or color space. For example, a picture in a YUV format includes a luma component indicated by Y (or sometimes indicated by L) and two chroma components indicated by U and V. The luminance (luma) component Y represents brightness or gray level intensity (for example, both are the same in a gray-scale picture), and the two chrominance (chroma) components U and V represent chroma or color information components. Correspondingly, the picture in the YUV format includes a luma sample array of luma sample values (Y) and two chroma sample arrays of chroma values (U and V). A picture in an RGB format may be transformed or converted into a YUV format and vice versa. This process is also referred to as color conversion or transformation. If a picture is monochrome, the picture may include only a luma sample array. In this embodiment, a picture transmitted by the picture source 16 to the picture processor may also be referred to as raw picture data 17.

The picture preprocessor 18 is configured to receive the raw picture data 17 and perform preprocessing on the raw picture data 17 to obtain a preprocessed picture 19 or preprocessed picture data 19. For example, the preprocessing performed by the picture preprocessor 18 may include trimming, color format conversion (for example, from an RGB format to a YUV format), color correction, or denoising.

The encoder 20 (or referred to as a video encoder 20) is configured to receive the preprocessed picture data 19, and process the preprocessed picture data 19 in a related prediction mode (such as a prediction mode in the embodiments of this specification), to provide encoded picture data 21 (structural details of the encoder 20 are further described below based on FIG. 2, FIG. 4, or FIG. 5). In some embodiments, the encoder 20 may be configured to perform various embodiments described below, to implement encoder-side application of a chroma block prediction method.

The communications interface 22 may be configured to receive the encoded picture data 21, and transmit the encoded picture data 21 to the destination device 14 or any other device (for example, a memory) through the link 13 for storage or direct reconstruction. The any other device may be any device used for decoding or storage. The communications interface 22 may be, for example, configured to encapsulate the encoded picture data 21 in an appropriate format, for example, into a data packet, for transmission over the link 13.

The destination device 14 includes a decoder 30. Optionally, the destination device 14 may further include a communications interface 28, a picture post-processor 32, and a display device 34. Descriptions are separately provided as follows.

The communications interface 28 may be configured to receive the encoded picture data 21 from the source device 12 or any other source. The any other source is, for example, a storage device. The storage device is, for example, an encoded picture data storage device. The communications interface 28 may be configured to transmit or receive the encoded picture data 21 through the link 13 between the source device 12 and the destination device 14 or through any type of network. The link 13 is, for example, a direct wired or wireless connection. The any type of network is, for example, a wired or wireless network or any combination thereof, or any type of private or public network or any combination thereof. The communications interface 28 may be, for example, configured to decapsulate the data packet transmitted through the communications interface 22, to obtain the encoded picture data 21.

Both the communications interface 28 and the communications interface 22 may be configured as unidirectional communications interfaces or bidirectional communications interfaces, and may be configured to, for example, send and receive messages to establish a connection, and acknowledge and exchange any other information related to a communication link and/or data transmission such as encoded picture data transmission.

The decoder 30 (or referred to as a decoder 30) is configured to receive the encoded picture data 21 and provide decoded picture data 31 or a decoded picture 31 (structural details of the decoder 30 are further described below based on FIG. 3, FIG. 4, or FIG. 5). In some embodiments, the decoder 30 may be configured to perform various embodiments described below, to implement decoder-side application of a chroma block prediction method.

The picture post-processor 32 is configured to perform post-processing on the decoded picture data 31 (also referred to as reconstructed picture data) to obtain post-processed picture data 33. The post-processing performed by the picture post-processor 32 may include color format conversion (for example, from a YUV format to an RGB format), color correction, trimming, re-sampling, or any other processing. The picture post-processor 32 may be further configured to transmit the post-processed picture data 33 to the display device 34.

The display device 34 is configured to receive the post-processed picture data 33 to display a picture, for example, to a user or a viewer. The display device 34 may be or may include any type of display for presenting a reconstructed picture, for example, an integrated or external display or monitor. For example, the display may include a liquid crystal display (LCD), an organic light emitting diode (OLED) display, a plasma display, a projector, a micro LED display, a liquid crystal on silicon (LCoS), a digital light processor (DLP), or any type of other displays.

Although FIG. 1A depicts the source device 12 and the destination device 14 as separate devices, a device embodiment may alternatively include both the source device 12 and the destination device 14 or functionalities of both the source device 12 and the destination device 14, that is, the source device 12 or a corresponding functionality and the destination device 14 or a corresponding functionality. In such an embodiment, the source device 12 or the corresponding functionality and the destination device 14 or the corresponding functionality may be implemented by using same hardware and/or software, separate hardware and/or software, or any combination thereof.

Based on the descriptions, a person skilled in the art can definitely learn that existence and (exact) division of functionalities of different units or functionalities of the source device 12 and/or the destination device 14 shown in FIG. 1A may vary depending on an actual device and application. The source device 12 and the destination device 14 may include any one of a wide range of devices, including any type of handheld or stationary device, for example, a notebook or laptop computer, a mobile phone, a smartphone, a tablet or tablet computer, a video camera, a desktop computer, a set-top box, a television, a camera, a vehicle-mounted device, a display device, a digital media player, a video game console, a video streaming device (such as a content service server or a content delivery server), a broadcast receiver device, or a broadcast transmitter device, and may use or not use any type of operating system.

The encoder 20 and the decoder 30 each may be implemented as any one of various appropriate circuits, for example, one or more microprocessors, digital signal processors (DSPs), application-specific integrated circuits (ASICs), field programmable gate arrays (FPGAs), discrete logic, hardware, or any combination thereof. If the technologies are implemented partially by using software, a device may store software instructions in an appropriate and non-transitory computer-readable storage medium and may execute instructions by using hardware such as one or more processors, to perform the technologies of this disclosure. Any one of the foregoing content (including hardware, software, a combination of hardware and software, and the like) may be considered as one or more processors.

In some cases, the video encoding and decoding system 10 shown in FIG. 1A is merely an example and the technologies of this application may be applied to video coding settings (for example, video encoding or video decoding) that do not necessarily include any data communication between an encoding device and a decoding device. In other examples, data may be retrieved from a local memory, streamed over a network, or the like. A video encoding device may encode data and store encoded data into the memory, and/or a video decoding device may retrieve data from the memory and decode the data. In some examples, encoding and decoding are performed by devices that do not communicate with each other, but simply encode data to the memory and/or retrieve data from the memory and decode the data.

Figure 1B:
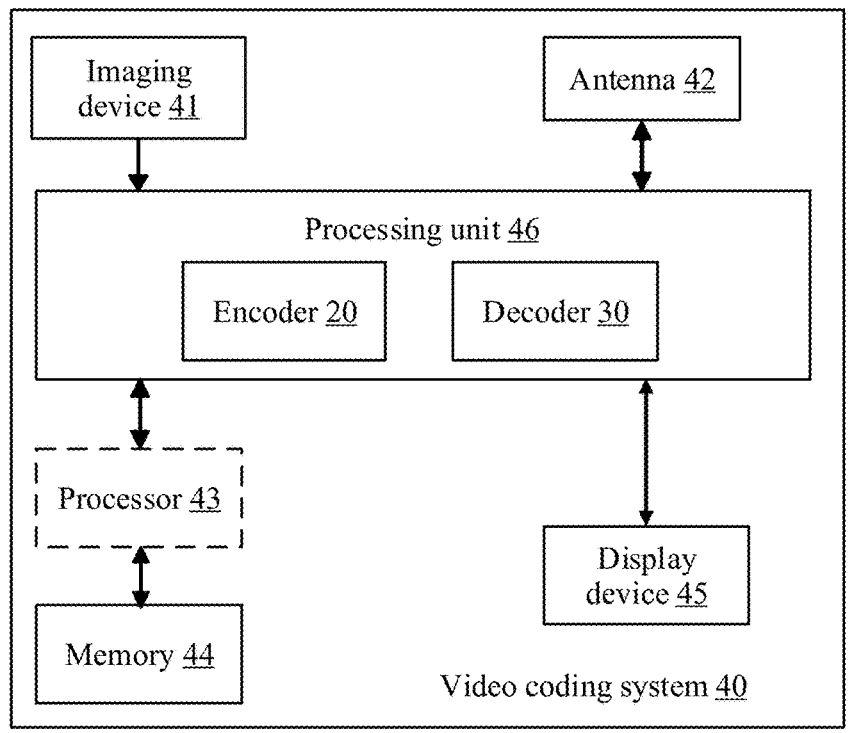
FIG. 1B is a diagram of an example of a video coding system 40 for implementing an embodiment of the disclosure.
Figure 2:
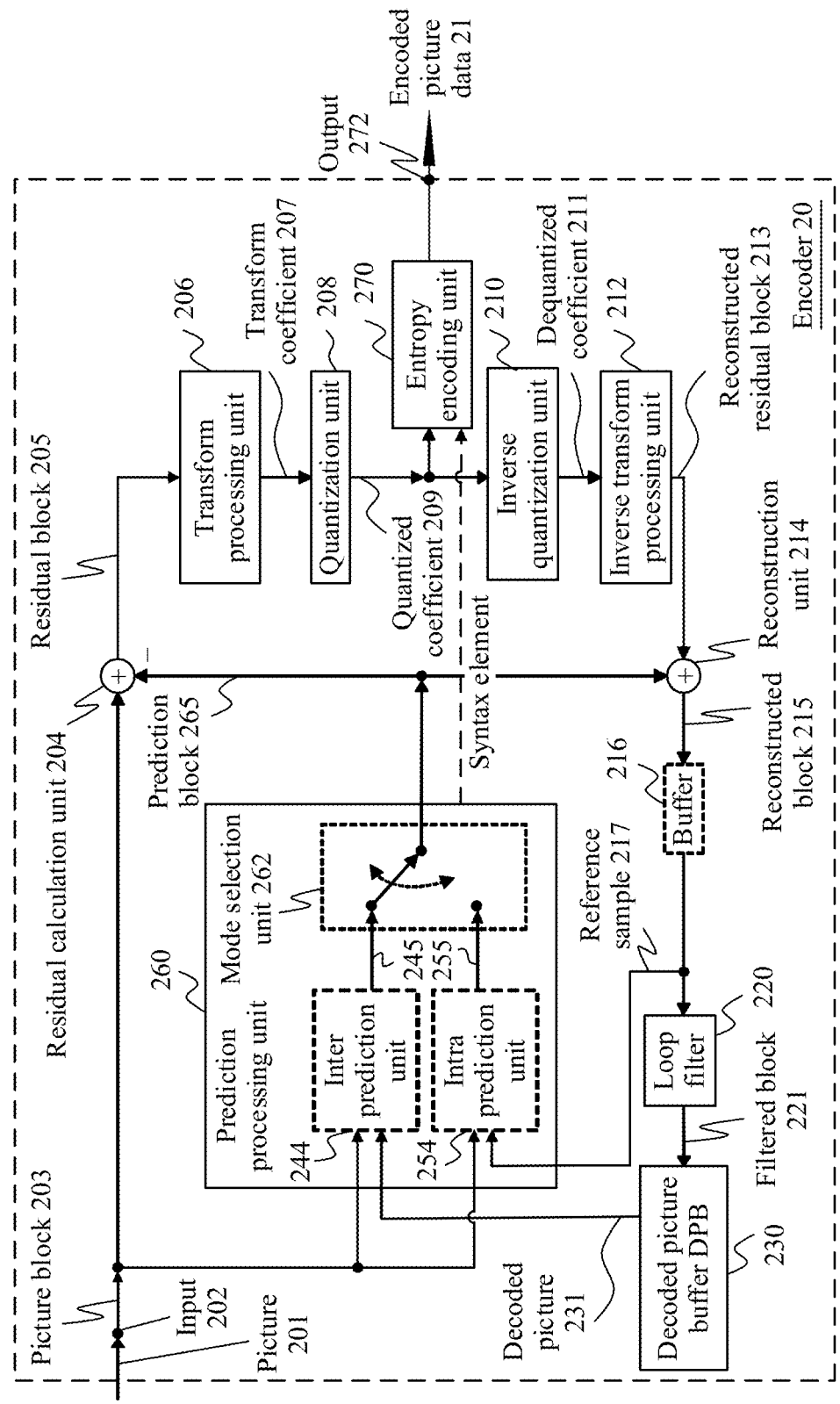
FIG. 2 is a diagram of an example structure of an encoder 20 for implementing an embodiment of the disclosure.
Figure 3:
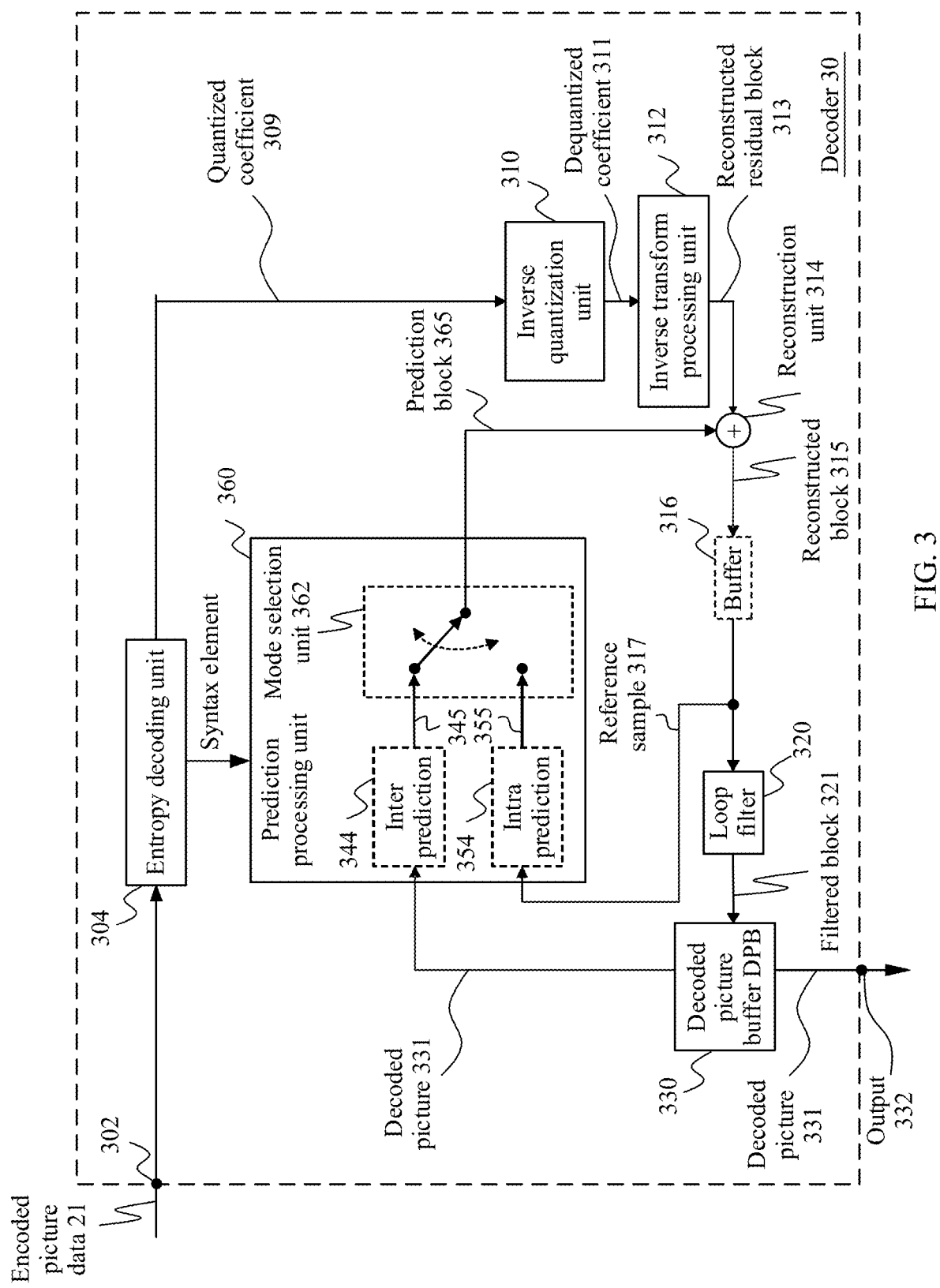
FIG. 3 is a diagram of an example structure of a decoder 30 for implementing an embodiment of the disclosure.

FIG. 1B is an illustrative diagram of an example of a video coding system 40 including an encoder 20 in FIG. 2 and/or a decoder 30 in FIG. 3 according to an example embodiment. The video coding system 40 can implement a combination of various technologies in the embodiments. In an illustrated implementation, the video coding system 40 may include an imaging device 41, the encoder 20, the decoder 30 (and/or a video encoder/decoder implemented by a logic circuit 47 of a processing unit 46), an antenna 42, one or more processors 43, one or more memories 44, and/or a display device 45.

As shown in FIG. 1B, the imaging device 41, the antenna 42, the processing unit 46, the logic circuit 47, the encoder 20, the decoder 30, the processor 43, the memory 44, and/or the display device 45 can communicate with each other. As described, although the video coding system 40 is illustrated with the encoder 20 and the decoder 30, the video coding system 40 may include only the encoder 20 or only the decoder 30 in different examples.

In some examples, the antenna 42 may be configured to transmit or receive an encoded bitstream of video data. In addition, in some examples, the display device 45 may be configured to present the video data. In some examples, the logic circuit 47 may be implemented by the processing unit 46. The processing unit 46 may include application-specific integrated circuit (ASIC) logic, a graphics processing unit, a general-purpose processor, or the like. The video coding system 40 may alternatively include an optional processor 43. The optional processor 43 may similarly include application-specific integrated circuit (ASIC) logic, a graphics processing unit, a general-purpose processor, or the like. In some examples, the logic circuit 47 may be implemented by using hardware, for example, dedicated hardware for video coding. The processor 43 may be implemented by using general-purpose software, an operating system, or the like. In addition, the memory 44 may be any type of memory, for example, a volatile memory (for example, a static random access memory (SRAM), a dynamic random access memory (DRAM)), or a nonvolatile memory (for example, a flash memory). In a non-limitative example, the memory 44 may be implemented by a cache memory. In some examples, the logic circuit 47 may access the memory 44 (for example, for implementing a picture buffer). In other examples, the logic circuit 47 and/or the processing unit 46 may include a memory (for example, a cache) for implementing a picture buffer or the like.

In some examples, the encoder 20 implemented by the logic circuit may include a picture buffer (which is implemented by, for example, the processing unit 46 or the memory 44) and a graphics processing unit (which is implemented by, for example, the processing unit 46). The graphics processing unit may be communicatively coupled to the picture buffer. The graphics processing unit may include the encoder 20 implemented by the logic circuit 47, to implement various modules that are described with reference to FIG. 2 and/or any other encoder system or subsystem described in this specification. The logic circuit may be configured to perform various operations described in this specification.

In some examples, the decoder 30 may be implemented by the logic circuit 47 in a similar manner, to implement various modules that are described with reference to the decoder 30 in FIG. 3 and/or any other decoder system or subsystem described in this specification. In some examples, the decoder 30 implemented by the logic circuit may include a picture buffer (which is implemented by the processing unit 2820 or the memory 44) and a graphics processing unit (which is implemented by, for example, the processing unit 46). The graphics processing unit may be communicatively coupled to the picture buffer. The graphics processing unit may include the decoder 30 implemented by the logic circuit 47, to implement various modules that are described with reference to FIG. 3 and/or any other decoder system or subsystem described in this specification.

In some examples, the antenna 42 may be configured to receive an encoded bitstream of video data. As described, the encoded bitstream may include data, an indicator, an index value, mode selection data, or the like that is related to video frame coding and that is described in this specification, for example, data related to coding partitioning (for example, a transform coefficient or a quantized transform coefficient, an optional indicator (as described), and/or data defining the coding partitioning). The video coding system 40 may further include the decoder 30 that is coupled to the antenna 42 and that is configured to decode the encoded bitstream. The display device 45 is configured to present a video frame.

It should be understood that, in this embodiment, for the example described with reference to the encoder 20, the decoder 30 may be configured to perform an inverse process. With regard to a signaling syntax element, the decoder 30 may be configured to receive and parse the syntax element and correspondingly decode related video data. In some examples, the encoder 20 may entropy-encode the syntax element into an encoded video bitstream. In such examples, the decoder 30 may parse the syntax element and correspondingly decode the related video data.

It should be noted that a motion vector prediction method described in the embodiments is mainly used in an inter prediction process. This process exists on both the encoder 20 and the decoder 30. The encoder 20 and the decoder 30 in the embodiments may be, for example, an encoder/a decoder corresponding to a video standard protocol such as H.263, H.264, HEVV, MPEG-2, MPEG-4, VP8, or VP9, or a next-generation video standard protocol (such as H.266).

FIG. 2 is a diagram of an example of an encoder 20 for implementing an embodiment. In the example in FIG. 2, the encoder 20 includes a residual calculation unit 204, a transform processing unit 206, a quantization unit 208, an inverse quantization unit 210, an inverse transform processing unit 212, a reconstruction unit 214, a buffer 216, a loop filter unit 220, a decoded picture buffer (decoded picture buffer, DPB) 230, a prediction processing unit 260, and an entropy encoding unit 270. The prediction processing unit 260 may include an inter prediction unit 244, an intra prediction unit 254, and a mode selection unit 262. The inter prediction unit 244 may include a motion estimation unit and a motion compensation unit (which are not shown in the figure). The encoder 20 shown in FIG. 2 may also be referred to as a hybrid video encoder or a video encoder based on a hybrid video codec.

For example, the residual calculation unit 204, the transform processing unit 206, the quantization unit 208, the prediction processing unit 260, and the entropy encoding unit 270 form a forward signal path of the encoder 20, whereas, for example, the inverse quantization unit 210, the inverse transform processing unit 212, the reconstruction unit 214, the buffer 216, the loop filter 220, the decoded picture buffer (decoded picture buffer, DPB) 230, and the prediction processing unit 260 form a backward signal path of the encoder. The backward signal path of the encoder corresponds to a signal path of a decoder (refer to the decoder 30 in FIG. 3).

The encoder 20 receives, for example, through an input 202, a picture 201 or a picture block 203 of the picture 201, for example, a picture in a sequence of pictures forming a video or a video sequence. The picture block 203 may also be referred to as a current picture block or a to-be-coded picture block, and the picture 201 may be referred to as a current picture or a to-be-coded picture (particularly in video coding, for distinguishing the current picture from other pictures, for example, previously encoded and/or decoded pictures in a same video sequence, that is, the video sequence that also includes the current picture).

In an embodiment, the encoder 20 may include a partitioning unit (not depicted in FIG. 2), configured to partition the picture 201 into a plurality of blocks such as picture blocks 203. The picture 201 is usually partitioned into a plurality of non-overlapping blocks. The partitioning unit may be configured to: use a same block size for all pictures in the video sequence and a corresponding grid defining the block size, or change a block size between pictures or subsets or groups of pictures, and partition each picture into corresponding blocks.

In an example, the prediction processing unit 260 of the encoder 20 may be configured to perform any combination of the partitioning technologies described above.

Like the picture 201, the picture block 203 is also or may be considered as a two-dimensional array or matrix of samples with sample values, although a size of the picture block 203 is smaller than a size of the picture 201. In other words, the picture block 203 may include, for example, one sample array (for example, a luma array in a case of a monochrome picture 201), three sample arrays (for example, one luma array and two chroma arrays in a case of a color picture), or any other quantity and/or type of arrays depending on an applied color format. Quantities of samples in horizontal and vertical directions (or axes) of the picture block 203 define a size of the picture block 203.

The encoder 20 shown in FIG. 2 is configured to encode the picture 201 block by block, for example, perform encoding and prediction on each picture block 203.

The residual calculation unit 204 is configured to calculate a residual block 205 based on the picture block 203 and a prediction block 265 (other details about the prediction block 265 are provided below), for example, by subtracting sample values of the prediction block 265 from sample values of the picture block 203 sample by sample (pixel by pixel), to obtain the residual block 205 in a sample domain.

The transform processing unit 206 is configured to apply a transform, for example, a discrete cosine transform (discrete cosine transform, DCT) or a discrete sine transform (discrete sine transform, DST), to sample values of the residual block 205 to obtain transform coefficients 207 in a transform domain. The transform coefficient 207 may also be referred to as a transform residual coefficient and represents the residual block 205 in the transform domain.

The transform processing unit 206 may be configured to apply integer approximations of DCT/DST, such as transforms specified in HEVC/H.265. In comparison with an orthogonal DCT transform, such an integer approximation is usually scaled by a factor. To preserve a norm of a residual block that is processed by using forward and inverse transforms, applying an additional scale factor is a part of a transform process. The scale factor is usually chosen based on some constraints. For example, the scale factor is a power of two for a shift operation, a bit depth of the transform coefficient, or a tradeoff between accuracy and implementation costs. For example, a specific scale factor is specified for the inverse transform by, for example, the inverse transform processing unit 212 at the side of the decoder 30 (and a corresponding inverse transform by, for example, the inverse transform processing unit 212 at the side of the encoder 20), and correspondingly, a corresponding scale factor may be specified for the forward transform by the transform processing unit 206 at the side of the encoder 20.

The quantization unit 208 is configured to quantize the transform coefficients 207 to obtain quantized transform coefficients 209, for example, by applying scalar quantization or vector quantization. The quantized transform coefficient 209 may also be referred to as a quantized residual coefficient 209. A quantization process may reduce a bit depth related to a part or all of the transform coefficients 207. For example, an n-bit transform coefficient may be rounded down to an m-bit transform coefficient during quantization, where n is greater than m. A quantization degree may be modified by adjusting a quantization parameter (quantization parameter, QP). For example, for scalar quantization, different scales may be applied to achieve finer or coarser quantization. A smaller quantization step corresponds to finer quantization, and a larger quantization step corresponds to coarser quantization. An applicable quantization step may be indicated by the quantization parameter (quantization parameter, QP). For example, the quantization parameter may be an index to a predefined set of applicable quantization steps. For example, a smaller quantization parameter may correspond to finer quantization (a smaller quantization step), and a larger quantization parameter may correspond to coarser quantization (a larger quantization step) or vice versa. The quantization may include division by a quantization step and corresponding quantization or inverse quantization, for example, performed by the inverse quantization unit 210, or may include multiplication by a quantization step. In embodiments according to some standards such as HEVC, a quantization parameter may be used to determine the quantization step. Generally, the quantization step may be calculated based on a quantization parameter by using a fixed point approximation of an equation including division. Additional scale factors may be introduced for quantization and dequantization to restore the norm of the residual block, where the norm of the residual block may be modified because of a scale used in the fixed point approximation of the equation for the quantization step and the quantization parameter. In an example implementation, scales of the inverse transform and the dequantization may be combined. Alternatively, a customized quantization table may be used and signaled from the encoder to the decoder, for example, in a bitstream. The quantization is a lossy operation, where a loss increases with an increasing quantization step.

The inverse quantization unit 210 is configured to apply inverse quantization of the quantization unit 208 to a quantization coefficient to obtain a dequantized coefficient 211, for example, apply, based on or by using a same quantization step as the quantization unit 208, the inverse of a quantization scheme applied by the quantization unit 208. The dequantized coefficient 211 may also be referred to as a dequantized residual coefficient 211 and correspond to the transform coefficient 207, although the dequantized coefficient 211 is usually different from the transform coefficient due to a loss caused by quantization.

The inverse transform processing unit 212 is configured to apply an inverse transform of the transform applied by the transform processing unit 206, for example, an inverse discrete cosine transform (DCT) or an inverse discrete sine transform (discrete sine transform, DST), to obtain an inverse transform block 213 in the sample domain. The inverse transform block 213 may also be referred to as an inverse transform dequantized block 213 or an inverse transform residual block 213.

The reconstruction unit 214 (for example, a summator 214) is configured to add the inverse transform block 213 (that is, a reconstructed residual block 213) to the prediction block 265, for example, by adding a sample value of the reconstructed residual block 213 and a sample value of the prediction block 265, to obtain a reconstructed block 215 in the sample domain.

Optionally, a buffer unit 216 ("buffer" 216 for short) of, for example, a line buffer 216, is configured to buffer or store the reconstructed block 215 and a corresponding sample value, for example, for intra prediction. In other embodiments, the encoder may be configured to use an unfiltered reconstructed block and/or a corresponding sample value that are/is stored in the buffer unit 216, for any type of estimation and/or prediction, for example, intra prediction.

For example, in an embodiment, the encoder 20 may be configured so that the buffer unit 216 is configured to store the reconstructed block 215 not only used for intra prediction 254 but also used for the loop filter unit 220 (not shown in FIG. 2), and/or so that, for example, the buffer unit 216 and the decoded picture buffer 230 form one buffer. In other embodiments, a filtered block 221 and/or a block or a sample from the decoded picture buffer 230 (the block or sample is not shown in FIG. 2) are/is used as an input or a basis for the intra prediction unit 254.

The loop filter unit 220 (loop filter 220 for short) is configured to filter the reconstructed block 215 to obtain the filtered block 221, to smooth pixel transition or improve video quality. The loop filter unit 220 is intended to represent one or more loop filters, for example, a deblocking filter, a sample-adaptive offset (SAO) filter, or another filter such as a bilateral filter, an adaptive loop filter (ALF), a sharpening or smoothing filter, or a collaborative filter. Although the loop filter unit 220 is shown as an in-loop filter in FIG. 2, in another configuration, the loop filter unit 220 may be implemented as a post-loop filter. The filtered block 221 may also be referred to as a filtered reconstructed block 221. The decoded picture buffer 230 may store a reconstructed encoded block after the loop filter unit 220 performs a filtering operation on the reconstructed encoded block.

In an embodiment, the encoder 20 (correspondingly, the loop filter unit 220) may be configured to output a loop filter parameter (for example, sample adaptive offset information), for example, directly or after entropy encoding performed by the entropy encoding unit 270 or any other entropy encoding unit, so that, for example, the decoder 30 can receive and apply the same loop filter parameter for decoding.

The decoded picture buffer (DPB) 230 may be a reference picture memory that stores reference picture data for use in video data encoding by the encoder 20. The DPB 230 may be formed by any one of a variety of memory devices such as a dynamic random access memory (DRAM) (including a synchronous DRAM (SDRAM), a magnetoresistive RAM (MRAM), and a resistive RAM (RRAM)), or another type of memory device. The DPB 230 and the buffer 216 may be provided by a same memory device or separate memory devices. In an example, the decoded picture buffer (DPB) 230 is configured to store the filtered block 221. The decoded picture buffer 230 may be further configured to store another previously filtered block, for example, a previously reconstructed and filtered block 221, of a same current picture or of a different picture, for example, a previously reconstructed picture, and may provide a complete previously reconstructed, that is, decoded picture (and a corresponding reference block and sample) and/or a partially reconstructed current picture (and a corresponding reference block and sample), for example, for inter prediction. In an example, if the reconstructed block 215 is reconstructed without in-loop filtering, the decoded picture buffer (DPB) 230 is configured to store the reconstructed block 215.

The prediction processing unit 260, also referred to as a block prediction processing unit 260, is configured to receive or obtain the picture block 203 (a current picture block 203 of the current picture 201) and reconstructed picture data, for example, reference samples of the same (current) picture from the buffer 216 and/or reference picture data 231 of one or more previously decoded pictures from the decoded picture buffer 230; and is configured to process such data for prediction, that is, to provide the prediction block 265 that may be an inter prediction block 245 or an intra prediction block 255.

The mode selection unit 262 may be configured to select a prediction mode (for example, an intra or inter prediction mode) and/or a corresponding prediction block 245 or 255 to be used as the prediction block 265, to calculate the residual block 205 and reconstruct the reconstructed block 215.

In an embodiment, the mode selection unit 262 may be configured to select the prediction mode (for example, from prediction modes supported by the prediction processing unit 260), where the prediction mode provides a best match or a minimum residual (the minimum residual means better compression for transmission or storage), or provides a minimum signaling overhead (the minimum signaling overhead means better compression for transmission or storage), or considers or balances both. The mode selection unit 262 may be configured to determine the prediction mode based on rate-distortion optimization (RDO), select a prediction mode that provides minimum rate-distortion optimization or select a prediction mode for which related rate distortion at least satisfies a prediction mode selection criterion.

The following describes in detail prediction processing performed (for example, by the prediction processing unit 260) and mode selection performed (for example, by the mode selection unit 262) in an example of the encoder 20.

As described above, the encoder 20 is configured to determine or select an optimal or optimum prediction mode from a set of (predetermined) prediction modes. The set of prediction modes may include, for example, an intra prediction mode and/or an inter prediction mode.

A set of intra prediction modes may include 35 different intra prediction modes, for example, non-directional modes such as a DC (or average) mode and a planar mode, or directional modes such as those defined in H.265, or may include 67 different intra prediction modes, for example, non-directional modes such as a DC (or average) mode and a planar mode, or directional modes such as those defined in H.266 under development.

In an implementation, a set of inter prediction modes depends on available reference pictures (namely, for example, at least a part of decoded pictures stored in the DBP 230, as described above) and other inter prediction parameters, for example, depends on whether an entire reference picture or only a part of the reference picture, for example, a search window region around a region of the current block, is used for searching for an optimal matching reference block, and/or for example, depends on whether pixel interpolation such as half-pixel and/or quarter-pixel interpolation is applied. The set of inter prediction modes may include, for example, an advanced motion vector prediction (Advanced Motion Vector Prediction, AMVP) mode and a merge (merge) mode. During an implementation, the set of inter prediction modes may include an AMVP mode based on a control point and a merge mode based on a control point that are improved in the embodiments. In an example, the intra prediction unit 254 may be configured to perform any combination of inter prediction technologies described below.

In addition to the foregoing prediction modes, a skip mode and/or a direct mode may also be applied in the embodiments.

The prediction processing unit 260 may be further configured to partition the picture block 203 into smaller block partitions or subblocks, for example, by iteratively using quadtree (quadtree, QT) partitioning, binary tree (binary tree, BT) partitioning, triple tree (triple tree, TT) partitioning, or any combination thereof, and perform, for example, prediction on each of the block partitions or subblocks. Mode selection includes selection of a tree structure of the partitioned picture block 203 and selection of a prediction mode applied for each of the block partitions or subblocks.

The inter prediction unit 244 may include a motion estimation (motion estimation, ME) unit (not shown in FIG. 2) and a motion compensation (motion compensation, MC) unit (not shown in FIG. 2). The motion estimation unit is configured to receive or obtain the picture block 203 (the current picture block 203 of the current picture 201) and a decoded picture 231, or at least one or more previously reconstructed blocks, for example, one or more reconstructed blocks of other/different previously decoded pictures 231, for motion estimation. For example, a video sequence may include the current picture and a previously decoded picture 31, or in other words, the current picture and the previously decoded picture 31 may be a part of or form a sequence of pictures forming the video sequence.

For example, the encoder 20 may be configured to select a reference block from a plurality of reference blocks of a same picture or different pictures in a plurality of other pictures and provide, for the motion estimation unit (not shown in FIG. 2), a reference picture and/or provide an offset (a spatial offset) between a position (coordinates X and Y) of the reference block and a position of the current block as an inter prediction parameter. This offset is also referred to as a motion vector (motion vector, MV).

The motion compensation unit is configured to obtain the inter prediction parameter, and perform inter prediction based on or by using the inter prediction parameter, to obtain the inter prediction block 245. Motion compensation performed by the motion compensation unit (not shown in FIG. 2) may include fetching or generating a prediction block based on a motion/block vector determined through motion estimation (possibly by performing interpolation in sub-pixel precision). Interpolation filtering may generate additional pixel samples from known pixel samples. This potentially increases a quantity of candidate prediction blocks that may be used to code a picture block. Upon receiving a motion vector for a PU of the current picture block, the motion compensation unit 246 may locate a prediction block to which the motion vector points in one reference picture list. The motion compensation unit 246 may further generate syntax elements associated with a block and a video slice, for decoding a picture block of the video slice by the decoder 30.

The inter prediction unit 244 may transmit the syntax elements to the entropy encoding unit 270, where the syntax elements include the inter prediction parameter (such as indication information of selection of an inter prediction mode used for prediction of the current block after traversal of a plurality of inter prediction modes). In an application scenario, if there is only one inter prediction mode, the inter prediction parameter may alternatively not be carried in the syntax element. In this case, the decoder 30 may directly perform decoding in a default prediction mode. It may be understood that the inter prediction unit 244 may be configured to perform any combination of inter prediction technologies.

The intra prediction unit 254 is configured to obtain, for example, receive, a picture block 203 (a current picture block) and one or more previously reconstructed blocks, for example, reconstructed neighboring blocks, of a same picture for intra estimation. For example, the encoder 20 may be configured to select an intra prediction mode from a plurality of (predetermined) intra prediction modes.

In an embodiment, the encoder 20 may be configured to select the intra prediction mode according to an optimization criterion, for example, based on a minimum residual (for example, an intra prediction mode providing the prediction block 255 that is most similar to the current picture block 203) or minimum rate distortion.

The intra prediction unit 254 is further configured to determine the intra prediction block 255 based on, for example, an intra prediction parameter in the selected intra prediction mode. In any case, after selecting an intra-prediction mode for a block, the intra prediction unit 254 is further configured to provide an intra prediction parameter, that is, information indicating the selected intra-prediction mode for the block, to the entropy encoding unit 270. In an example, the intra prediction unit 254 may be configured to perform any combination of intra prediction technologies.

The intra prediction unit 254 may transmit syntax elements to the entropy encoding unit 270, where the syntax elements include the intra prediction parameter (such as indication information of selection of an intra prediction mode used for prediction of the current block after traversal of a plurality of intra prediction modes). In an application scenario, if there is only one intra prediction mode, the intra prediction parameter may alternatively not be carried in the syntax element. In this case, the decoder 30 may directly perform decoding in a default prediction mode.

The entropy encoding unit 270 is configured to apply (or skip applying) an entropy encoding algorithm or scheme (for example, a variable length coding (variable length coding, VLC) scheme, a context adaptive VLC (context adaptive VLC, CAVLC) scheme, an arithmetic coding scheme, context adaptive binary arithmetic coding (context adaptive binary arithmetic coding, CABAC), syntax-based context-adaptive binary arithmetic coding (syntax-based context-adaptive binary arithmetic coding, SBAC), probability interval partitioning entropy (probability interval partitioning entropy, PIPE) coding, or another entropy encoding methodology or technique) on one or all of the following: the quantized coefficient 209, the inter prediction parameter, the intra prediction parameter, and/or the loop filter parameter, to obtain the encoded picture data 21 that may be output through an output 272, for example, in a form of an encoded bitstream 21. The encoded bitstream may be transmitted to the video decoder 30, or archived for later transmission or retrieval by the video decoder 30. The entropy encoding unit 270 may be further configured to entropy encode another syntax element for a current video slice that is being encoded.

Another structural variant of the video encoder 20 may be used to encode a video bitstream. For example, a non-transform based encoder 20 may directly quantize a residual signal without the transform processing unit 206 for some blocks or frames. In another implementation, the encoder 20 may have the quantization unit 208 and the inverse quantization unit 210 that are combined into a single unit.

In this embodiment, the encoder 20 may be configured to implement a motion vector prediction method described in the following embodiments.

It should be understood that another structural variant of the video encoder 20 may be used to encode a video bitstream. For example, for some picture blocks or picture frames, the video encoder 20 may directly quantize a residual signal, processing by the transform processing unit 206 is not required, and correspondingly, processing by the inverse transform processing unit 212 is not required either. Alternatively, for some picture blocks or picture frames, the video encoder 20 does not generate residual data, and correspondingly, processing by the transform processing unit 206, the quantization unit 208, the inverse quantization unit 210, and the inverse transform processing unit 212 is not required. Alternatively, the video encoder 20 may directly store a reconstructed picture block as a reference block, and processing by the filter 220 is not required. Alternatively, the quantization unit 208 and the inverse quantization unit 210 in the video encoder 20 may be combined. The loop filter 220 is optional, and in a case of lossless compression coding, the transform processing unit 206, the quantization unit 208, the inverse quantization unit 210, and the inverse transform processing unit 212 are optional. It should be understood that, according to different application scenarios, the inter prediction unit 244 and the intra prediction unit 254 may be selectively enabled.

FIG. 3 is a diagram of an example of a decoder 30 for implementing an embodiment. The video decoder 30 is configured to receive encoded picture data (for example, an encoded bitstream) 21 obtained through encoding by, for example, an encoder 20, to obtain a decoded picture 231. In a decoding process, the video decoder 30 receives video data from the video encoder 20, for example, an encoded video bitstream that represents a picture block of an encoded video slice, and an associated syntax element.

In the example in FIG. 3, the decoder 30 includes an entropy decoding unit 304, an inverse quantization unit 310, an inverse transform processing unit 312, a reconstruction unit 314 (for example, a summator 314), a buffer 316, a loop filter 320, a decoded picture buffer 330, and a prediction processing unit 360. The prediction processing unit 360 may include an inter prediction unit 344, an intra prediction unit 354, and a mode selection unit 362. In some examples, the video decoder 30 may perform a decoding process generally reciprocal to the encoding process described with reference to the video encoder 20 in FIG. 2.

The entropy decoding unit 304 is configured to perform entropy decoding on the encoded picture data 21 to obtain, for example, a quantized coefficient 309 and/or a decoded coding parameter (not shown in FIG. 3), for example, any one or all of an inter prediction parameter, an intra prediction parameter, a loop filter parameter, and/or another syntax element (that are decoded). The entropy decoding unit 304 is further configured to forward the inter prediction parameter, the intra prediction parameter, and/or the another syntax element to the prediction processing unit 360. The video decoder 30 may receive syntax elements at a video slice level and/or a video block level.

The inverse quantization unit 310 may have a same function as the inverse quantization unit 110. The inverse transform processing unit 312 may have a same function as the inverse transform processing unit 212. The reconstruction unit 314 may have a same function as the reconstruction unit 214. The buffer 316 may have a same function as the buffer 216. The loop filter 320 may have a same function as the loop filter 220. The decoded picture buffer 330 may have a same function as the decoded picture buffer 230.

The prediction processing unit 360 may include the inter prediction unit 344 and the intra prediction unit 354. A function of the inter prediction unit 344 may be similar to a function of the inter prediction unit 244, and a function of the intra prediction unit 354 may be similar to a function of the intra prediction unit 254. The prediction processing unit 360 is usually configured to perform block prediction and/or obtain a prediction block 365 from the encoded data 21, and receive or obtain (explicitly or implicitly) a prediction-related parameter and/or information about a selected prediction mode, for example, from the entropy decoding unit 304.

When a video slice is encoded as an intra-encoded (I) slice, the intra prediction unit 354 of the prediction processing unit 360 is configured to generate the prediction block 365 for a picture block of the current video slice based on a signaled intra prediction mode and data that is from a previously decoded block of a current frame or picture. When a video frame is encoded as an inter-encoded (B or P) slice, the inter prediction unit 344 (for example, a motion compensation unit) of the prediction processing unit 360 is configured to generate the prediction block 365 for a video block of the current video slice based on a motion vector and another syntax element that is received from the entropy decoding unit 304. For inter prediction, the prediction block may be generated from one reference picture in one reference picture list. The video decoder 30 may construct reference frame lists: a list 0 and a list 1, by using a default construction technology based on reference pictures stored in the DPB 330.

The prediction processing unit 360 is configured to determine prediction information for the video block of the current video slice by parsing the motion vector and the another syntax element, and use the prediction information to generate a prediction block for the current video block that is being decoded. In an example, the prediction processing unit 360 determines, by using some received syntax elements, a prediction mode (for example, intra or inter prediction) for encoding the video block of the video slice, an inter prediction slice type (for example, a B slice, a P slice, or a GPB slice), construction information of one or more of the reference picture lists for the slice, a motion vector for each inter encoded video block of the slice, an inter prediction status of each inter encoded video block of the slice, and other information, to decode the video block of the current video slice. In another example of this disclosure, syntax elements received by the video decoder 30 from a bitstream include syntax elements in one or more of an adaptive parameter set (adaptive parameter set, APS), a sequence parameter set (sequence parameter set, SPS), a picture parameter set (picture parameter set, PPS), or a slice header.

The inverse quantization unit 310 may be configured to perform inverse quantization (namely, dequantization) on a quantized transform coefficient that is provided in the bitstream and that is decoded by the entropy decoding unit 304. An inverse quantization process may include: using a quantization parameter calculated by the video encoder 20 for each video block in the video slice, to determine a degree of quantization that should be applied and, likewise, a degree of inverse quantization that should be applied.

The inverse transform processing unit 312 is configured to apply an inverse transform (for example, an inverse DCT, an inverse integer transform, or a conceptually similar inverse transform process) to a transform coefficient, to generate a residual block in a pixel domain.

The reconstruction unit 314 (for example, the summator 314) is configured to add an inverse transform block 313 (that is, a reconstructed residual block 313) to the prediction block 365, for example, by adding a sample value of the reconstructed residual block 313 and a sample value of the prediction block 365, to obtain a reconstructed block 315 in a sample domain.

The loop filter unit 320 (during a coding loop or after a coding loop) is configured to filter the reconstructed block 315 to obtain a filtered block 321, to smooth pixel transition or improve video quality. In an example, the loop filter unit 320 may be configured to perform any combination of filtering technologies described below. The loop filter unit 320 is intended to represent one or more loop filters, for example, a deblocking filter, a sample-adaptive offset (sample-adaptive offset, SAO) filter, or another filter such as a bilateral filter, an adaptive loop filter (adaptive loop filter, ALF), a sharpening or smoothing filter, or a collaborative filter. Although the loop filter unit 320 is shown as an in-loop filter in FIG. 3, in another configuration, the loop filter unit 320 may be implemented as a post-loop filter.

A decoded video block 321 in a given frame or picture is then stored in the decoded picture buffer 330 that stores a reference picture used for subsequent motion compensation.

The decoder 30 is configured to, for example, output a decoded picture 31 through an output 332, for presentation to a user or viewing by a user.

Another variant of the video decoder 30 may be used to decode a compressed bitstream. For example, the decoder 30 may generate an output video bitstream without the loop filter unit 320. For example, a non-transform based decoder 30 may directly inverse-quantize a residual signal without the inverse transform processing unit 312 for some blocks or frames. In another implementation, the video decoder 30 may have the inverse quantization unit 310 and the inverse transform processing unit 312 that are combined into a single unit.

In this embodiment, the decoder 30 is configured to implement a motion vector prediction method described in the following embodiments.

It should be understood that another structural variant of the video decoder 30 may be configured to decode an encoded video bitstream. For example, the video decoder 30 may generate an output video bitstream without processing by the filter 320. Alternatively, for some picture blocks or picture frames, the entropy decoding unit 304 of the video decoder 30 does not obtain quantized coefficients through decoding, and correspondingly, processing by the inverse quantization unit 310 and the inverse transform processing unit 312 is not required. The loop filter 320 is optional, and in a case of lossless compression, the inverse quantization unit 310 and the inverse transform processing unit 312 are optional. It should be understood that, according to different application scenarios, the inter prediction unit and the intra prediction unit may be selectively enabled.

It should be understood that on the encoder 20 and the decoder 30 in this application, a processing result for a procedure may be output to a next procedure after being further processed. For example, after a procedure such as interpolation filtering, motion vector derivation, or loop filtering, an operation such as clip or shift (shift) is further performed on a processing result of the corresponding procedure.

For example, a motion vector of a control point of the current picture block or a motion vector of a subblock of the current picture block derived from a motion vector of a neighboring affine coding block may be further processed. This is not limited in this application. For example, a value of the motion vector is constrained to be within a specific bit depth range. Assuming that an allowed bit depth of the motion vector is bitDepth, the value of the motion vector ranges from $-2^{(bitDepth-1)}$ to $2^{(bitDepth-1)}-1$, where the symbol "^" represents exponentiation. If bitDepth is 16, the value ranges from −32768 to 32767. If bitDepth is 18, the value ranges from −131072 to 131071. For another example, the value of the motion vector (for example, motion vectors MVs of four 4×4 subblocks in one 8×8 picture block) is constrained, so that a maximum difference between integer parts of the MVs of the four 4×4 subblocks does not exceed N pixels, for example, not exceed one pixel.

The following two manners may be used to constrain the value of the motion vector to be within a specific bit depth range:

Manner 1: An overflow most significant bit of the motion vector is removed:

$$ux = \left(vx + 2^{bitDepth}\right) \% \, 2^{bitDepth}$$
$$vx = \left(ux >= 2^{bitDepth-1}\right)? \left(ux - 2^{bitDepth}\right): ux$$
$$uy = \left(vy + 2^{bitDepth}\right) \% \, 2^{bitDepth}$$
$$vy = \left(uy >= 2^{bitDepth-1}\right)? \left(uy - 2^{bitDepth}\right): uy$$

vx represents a horizontal component of the motion vector of the picture block or the subblock of the picture block. vy represents a vertical component of the motion vector of the picture block or the subblock of the picture block. ux and uy are intermediate values. bitDepth represents a bit depth.

For example, a value of vx is −32769, and 32767 is obtained according to the foregoing formulas. A value is stored on a computer in a two's complement representation, a two's complement representation of −32769 is 1,0111, 1111,1111,1111 (17 bits), and processing performed by the computer for overflowing is discarding a most significant bit. Therefore, a value of vx is 0111,1111,1111,1111, that is, 32767. This value is consistent with the result obtained through processing according to the formulas.

Manner 2: Clipping is performed on the motion vector according to the following formulas:

$$vx = \text{Clip } 3\left(-2^{bitDepth-1}, 2^{bitDepth-1} - 1, vx\right)$$
$$vy = \text{Clip } 3\left(-2^{bitDepth-1}, 2^{bitDepth-1} - 1, vy\right)$$

vx represents a horizontal component of the motion vector of the picture block or the subblock of the picture block. vy represents a vertical component of the motion vector of the picture block or the subblock of the picture block. x, y, and z respectively correspond to three input values of an MV clamping process Clip 3. Clip 3 is defined to indicate clipping a value of z into a range [x, y].

$$\text{Clip } 3(x, y, z) = \begin{cases} x; & z < x \\ y; & z > y \\ z; & \text{otherwise} \end{cases}$$

Figure 4:
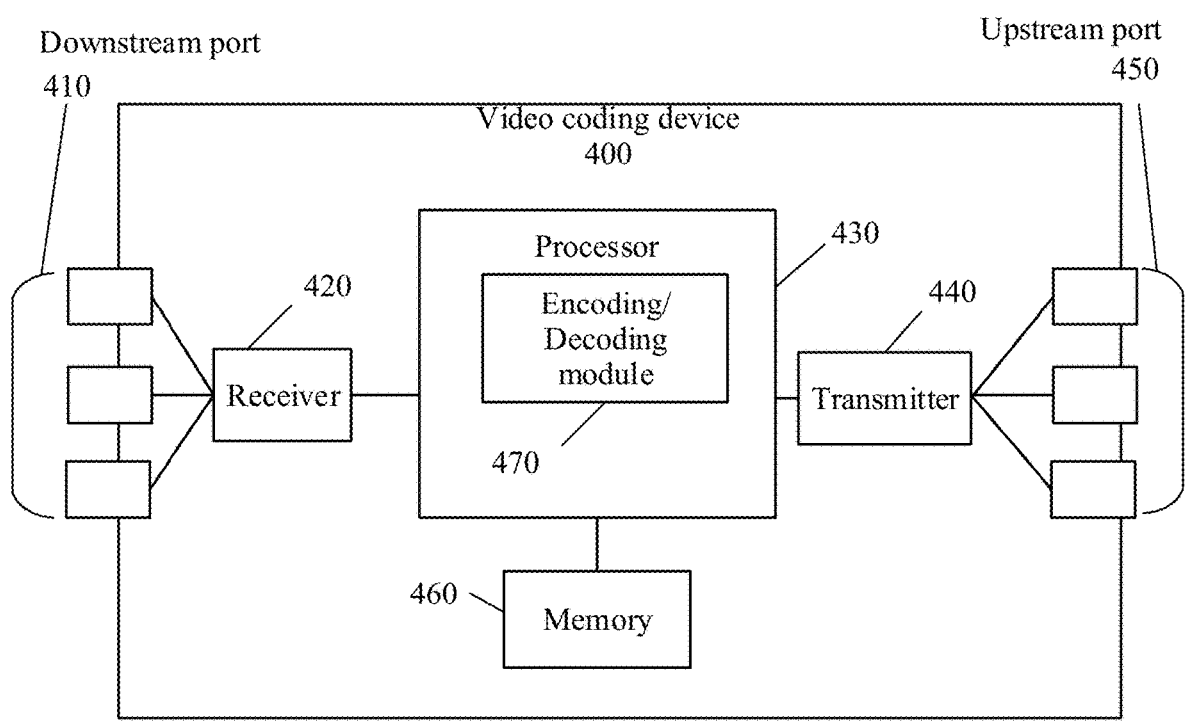
FIG. 4 is a diagram of an example of a video coding device 400 for implementing an embodiment of the disclosure.

FIG. 4 is a diagram of a structure of a video coding device 400 (for example, a video encoding device 400 or a video decoding device 400) according to an embodiment. The video coding device 400 is suitable for implementing the embodiments described in this specification. In an embodiment, the video coding device 400 may be a video decoder (for example, the decoder 30 in FIG. 1A) or a video encoder (for example, the encoder 20 in FIG. 1A). In another embodiment, the video coding device 400 may be one or more components of the decoder 30 in FIG. 1A or the encoder 20 in FIG. 1A.

The video coding device 400 includes: an ingress port 410 and a receiver unit (Rx) 420 for receiving data; a processor, a logic unit, or a central processing unit (CPU) 430 for processing data; a transmitter unit (Tx) 440 and an egress port 450 for transmitting data; and a memory 460 for storing data. The video coding device 400 may further include an optical-to-electrical conversion component and an electrical-to-optical (EO) component that are coupled to the ingress port 410, the receiver unit 420, the transmitter unit 440, and the egress port 450 for egress or ingress of optical or electrical signals.

The processor 430 is implemented by using hardware and software. The processor 430 may be implemented as one or more CPU chips, cores (for example, a multi-core processor), FPGAs, ASICs, and DSPs. The processor 430 communicates with the ingress port 410, the receiver unit 420, the transmitter unit 440, the egress port 450, and the memory 460. The processor 430 includes a coding module 470 (for example, an encoding module 470 or a decoding module 470). The encoding/decoding module 470 implements the embodiments disclosed in this specification, to implement the chroma block prediction method provided in the embodiments. For example, the encoding/decoding module 470 implements, processes, or provides various coding operations. Therefore, the encoding/decoding module 470 provides a substantial improvement to a function of the video coding device 400 and affects transform of the video coding device 400 to a different state. Alternatively, the encoding/decoding module 470 is implemented as instructions stored in the memory 460 and executed by the processor 430.

The memory 460 includes one or more disks, tape drives, and solid-state drives, and may be used as an overflow data storage device, to store programs when such programs are selected for execution, and to store instructions and data that are read during program execution. The memory 460 may be volatile and/or non-volatile, and may be a read-only memory (ROM), a random access memory (RAM), a ternary content-addressable memory (ternary content-addressable memory, TCAM), and/or a static random access memory (SRAM).

Figure 5:
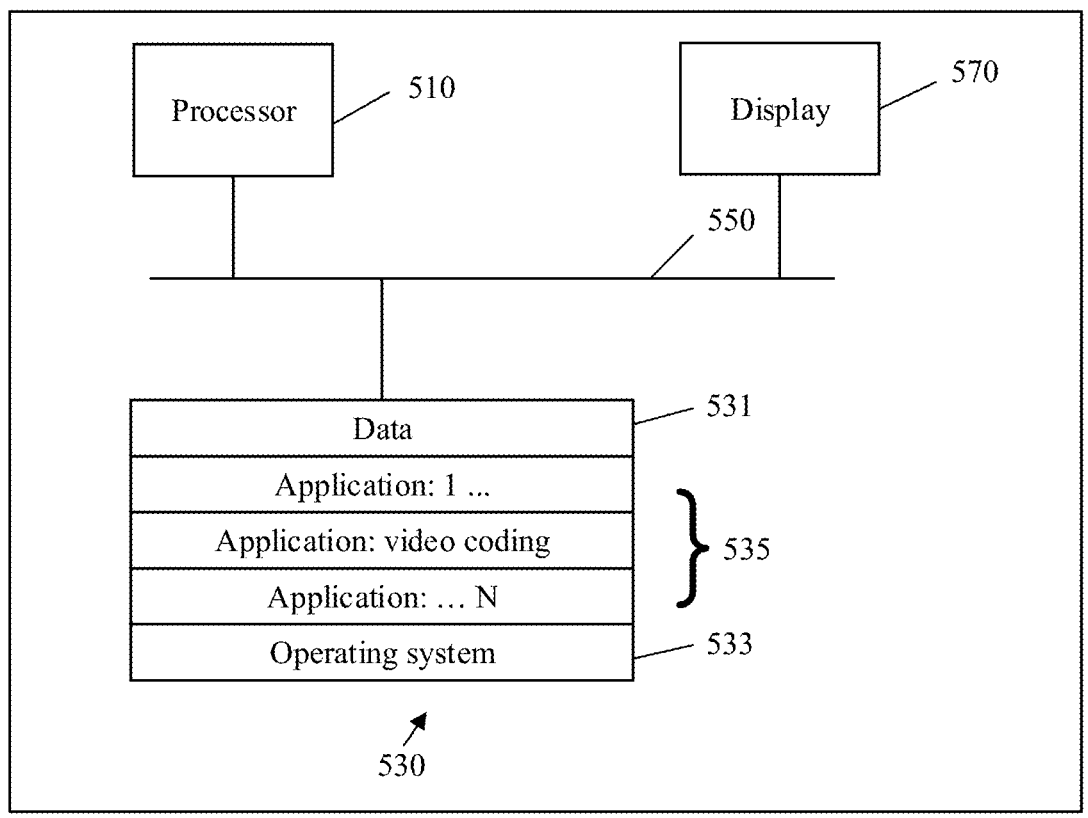
FIG. 5 is a diagram of another example of an encoding apparatus or a decoding apparatus for implementing an embodiment of the disclosure.

FIG. 5 is simplified block diagram of an apparatus 500 that may be used as either or both of the source device 12 and the destination device 14 in FIG. 1A according to an example embodiment. The apparatus 500 may implement the technologies of this application. In other words, FIG. 5 is a diagram of an implementation of an encoding device or a decoding device (a coding device 500 for short) according to an embodiment of this application. The coding device 500 may include a processor 510, a memory 530, and a bus system 550. The processor and the memory are connected through the bus system. The memory is configured to store instructions. The processor is configured to execute the instructions stored in the memory. The memory of the coding device stores program code. The processor may invoke the program code stored in the memory, to perform various video encoding or decoding methods described in this application, and in particular, various new inter prediction methods. To avoid repetition, details are not described herein.

In this embodiment of this application, the processor 510 may be a central processing unit (Central Processing Unit, "CPU" for short), or the processor 510 may be another general-purpose processor, a digital signal processor (DSP), an application-specific integrated circuit (ASIC), a field programmable gate array (FPGA), or another programmable logic device, discrete gate or transistor logic device, discrete hardware component, or the like. The general-purpose processor may be a microprocessor, or the processor may be any conventional processor or the like.

The memory 530 may include a read-only memory (ROM) device or a random access memory (RAM) device. Any other suitable type of storage device may alternatively be used as the memory 530. The memory 530 may include code and data 531 that are accessed by the processor 510 through the bus 550. The memory 530 may further include an operating system 533 and an application program 535. The application program 535 includes at least one program that allows the processor 510 to perform the video encoding or decoding method described in this application (in particular, the motion vector prediction method described in this application). For example, the application programs 535 may include applications 1 to N, and further includes a video encoding or decoding application (briefly referred to as a video coding application) that is used to perform the video encoding or decoding method described in this application.

The bus system 550 may further include a power bus, a control bus, a status signal bus, and the like, in addition to a data bus. However, for clear description, various types of buses in the figure are marked as the bus system 550.

Optionally, the coding device 500 may further include one or more output devices, for example, a display 570. In an example, the display 570 may be a touch-sensitive display that combines a display and a touch-sensitive unit that is operable to sense a touch input. The display 570 may be connected to the processor 510 through the bus 550.

Both the apparatuses or devices shown in FIG. 4 and FIG. 5 may be configured to perform the methods in the embodiments of this application.

As described above, inter prediction is an important part of a video encoding and decoding system.

In HEVC, the following two inter prediction modes are introduced: an advanced motion vector prediction (Advanced Motion Vector Prediction, AMVP) mode and a merge (Merge) mode.

In the AMVP mode, a candidate motion vector list is first constructed based on motion information of a coded unit that is spatially or temporally neighboring to a current coding unit, and an optimal motion vector is then determined from the candidate motion vector list and is used as a motion vector predictor (Motion vector predictor, MVP) of the current coding unit. A rate-distortion cost is calculated according to a formula (1), where J represents the rate-distortion cost (RD Cost), SAD represents a sum of absolute differences (Sum of Absolute Differences, SAD) between predicted pixel values and original pixel values that is obtained through motion estimation performed by using a candidate motion vector predictor, R represents a bit rate, and λ represents a Lagrange multiplier. An encoder side transfers, to a decoder side, an index value of a reference frame and an index value that is of the motion vector predictor selected based on the rate-distortion cost and that is in the candidate motion vector list. Further, motion search is performed in an MVP-centered neighboring domain, to obtain an actual motion vector of the current coding unit. The encoder side transfers a difference (Motion vector difference, MVD) between the MVP and the actual motion vector to the decoder side.

$$J = SAD + \lambda R \tag{1}$$

Figure 6:
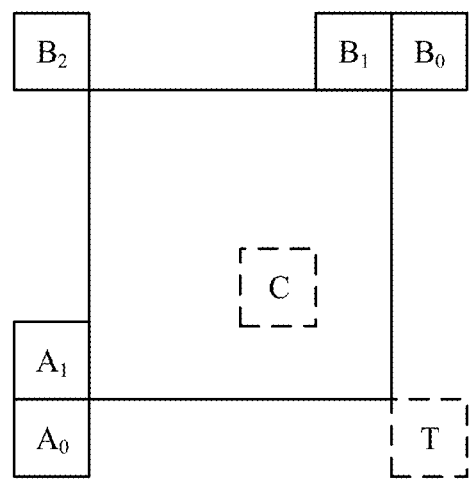
FIG. 6 is a diagram of an example of a spatially neighboring block and a temporal reference block that are used for implementing an embodiment of the disclosure.

In the merge mode, a candidate motion information list is first constructed based on motion information of a coded unit that is spatially or temporally neighboring to a current coding unit, optimal motion information is then determined from the candidate motion information list based on a rate-distortion cost and is used as motion information of the current coding unit, and an index value (denoted as a merge index, the same below) of a position of the optimal motion information in the candidate motion information list is transferred to the decoder side. Spatial and temporal candidate motion information of the current coding unit is shown in FIG. 6. The spatial candidate motion information is from five spatially neighboring blocks (A0, A1, B0, B1, and B2). If a neighboring block is unavailable or is in an intra coding mode or an intra block copy mode, the neighboring block is not added to the candidate motion information list. The temporal candidate motion information of the current coding unit is obtained by scaling an MV of a collocated block in a reference frame based on picture order counts (Picture order counts, POCs) of the reference frame and a current frame. Determining the collocated block includes: first determining whether a block at a position T in the reference frame is available, and if the block at the position T in the reference frame is unavailable, selecting a block at a position C as the collocated block.

During inter prediction in HEVC, motion compensation is performed based on an assumption that all pixels in a coding unit have same motion information, to obtain prediction values of the pixels in the coding unit. However, in the coding unit, not all pixels necessarily have a same motion feature. Therefore, prediction for all the pixels in the CU by using the same motion information may reduce accuracy of motion compensation, and further increase residual information.

To further increase coding efficiency, in some implementations, the coding unit is split into at least two coding subunits, then motion information of each coding subunit is derived, and motion compensation is performed based on the motion information of the coding subunits. This improves prediction accuracy. For example, a sub-coding unit based motion vector prediction (Sub-CU based motion vector prediction, SMVP) technology is used.

According to the SMVP, a current coding unit is split into coding subunits having a size of M×N, motion information of each coding subunit is derived, and then motion compensation is performed by using the motion information of each coding subunit, to obtain a prediction value of the current coding unit.

Based on the SMVP technology, one or two types of candidate motion information, that is, advanced temporal motion vector prediction (Advanced temporal motion vector prediction, ATMVP) and/or spatial-temporal motion vector prediction (Spatial-temporal motion vector prediction, STMVP), are added to the candidate prediction motion information list of the merge mode. Correspondingly, the candidate prediction motion information list is also referred to as a subblock-based merging candidate list (subblock-based merging candidate list).

In some implementations, the subblock-based merging candidate list includes one or more of: an ATMVP prediction mode, an affine model based prediction mode (including a prediction method in which an inherited control point motion vector is used and/or a prediction method in which a constructed control point motion vector is used), an inter planar (PLANAR) prediction mode.

Figure 7:
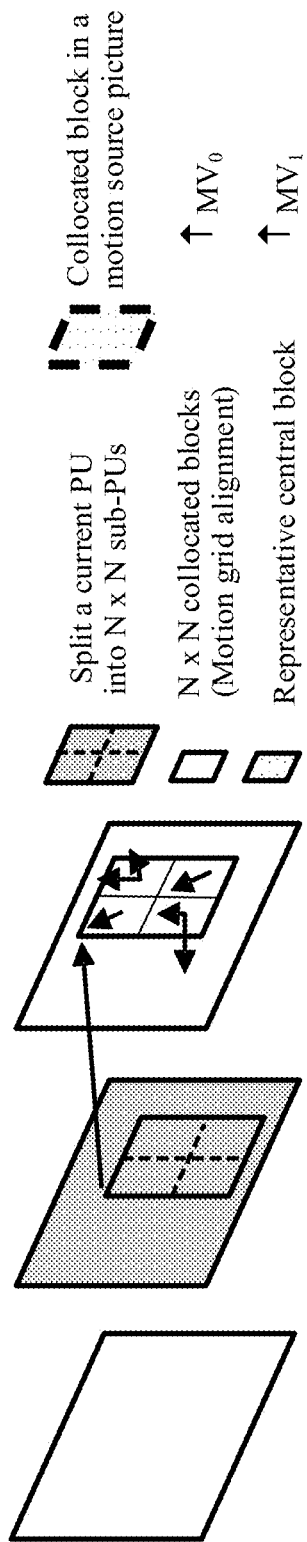
FIG. 7 is a diagram of an example of an AMVP prediction mode for implementing an embodiment of the disclosure.

As shown in FIG. 7, according to an ATMVP technology, a collocated reference frame (Collocated reference picture) is first determined, then a current coding unit is split into coding subunits having a size of M×N, motion information of a pixel at a center position of a coding subunit that corresponds to each current coding subunit and that is in the collocated reference frame is obtained, scaled, and converted into motion information of the current coding subunit. ATMVP is also referred to as subblock-based temporal motion vector prediction (SbTMVP).

Figure 8:
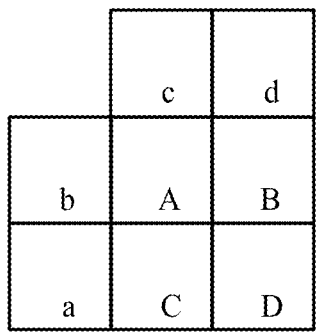
FIG. 8 is a diagram of an example of a subblock for implementing an embodiment of the disclosure.

According to an STMVP technology, motion information at an upper spatially neighboring position, motion information at a left spatially neighboring position, and motion information at a lower right temporally neighboring position of each current coding subunit are obtained, an average of the pieces of motion information is calculated and converted into motion information of the current coding subunit. As shown in FIG. 8, the current coding unit is split into four coding subunits: A, B, C, and D. A is used as an example. Motion information of the coding subunit A is derived by using motion information at spatially neighboring positions c and b and motion information at the position D in the collocated reference frame.

After the SMVP technology is used, ATMVP candidate motion information and STMVP candidate motion information are added to the candidate motion information list of the merge mode. In this case, an encoding process in the merge mode becomes as follows:

(1) Sequentially obtain motion information at the spatially neighboring positions A1, B1, B0, and A0, check availability of motion information at each position, optionally, remove a duplicate item, and insert available unremoved motion information into the candidate motion information list.

(2) Obtain corresponding motion information by using the ATMVP and STMVP technologies, check availability and remove a duplicate item, check availability of the obtained motion information, optionally, remove a duplicate item, and insert available unremoved motion information into the candidate motion information list.

(3) When a length of the candidate motion information list is less than 6, obtain motion information at the position B2, check availability of the motion information, optionally, remove a duplicate item, and insert the motion information into the candidate motion information list if the motion information is available and is not removed.

(4) Obtain motion information of the block corresponding to the position T in a neighboring encoded frame (if the motion information does not exist, motion information of a block corresponding to the position C is obtained), perform scaling based on a POC relationship between the neighboring encoded frame and the current frame, and insert scaled motion information into the candidate motion information list.

(5) If the length of the candidate motion information list is less than 7, fill motion information, to obtain the candidate motion information list whose length is 7, where the filled motion information may be 0 or other motion information obtained in a pre-agreed manner. This is not limited.

(6) Traverse each piece of candidate motion information in the candidate motion information list, perform motion compensation and reconstruction to obtain a reconstructed value, and then determine candidate motion information with a smallest rate-distortion cost (Rate-distortion cost, RD cost) according to a rate-distortion optimization (Rate-distortion optimization, RDO) method, to obtain a merge index corresponding to the candidate motion information with a smallest RD cost.

(7) Write the merge index into a bitstream based on the length of the candidate motion information list, and transfer the bitstream to the decoder side.

A process of performing inter prediction on a current to-be-processed picture by using the ATMVP technology mainly includes: determining an offset motion vector of a current to-be-processed block in the current to-be-processed picture; determining a collocated subblock of a to-be-processed subblock in a collocated reference picture based on a position of the to-be-processed subblock in the current to-be-processed block and the offset motion vector; determining a motion vector of the current to-be-processed subblock based on a motion vector of the collocated subblock; and performing motion compensation prediction on the to-be-processed subblock based on the motion vector of the to-be-processed subblock, to obtain a predicted pixel value of the to-be-processed subblock.

Figure 9:
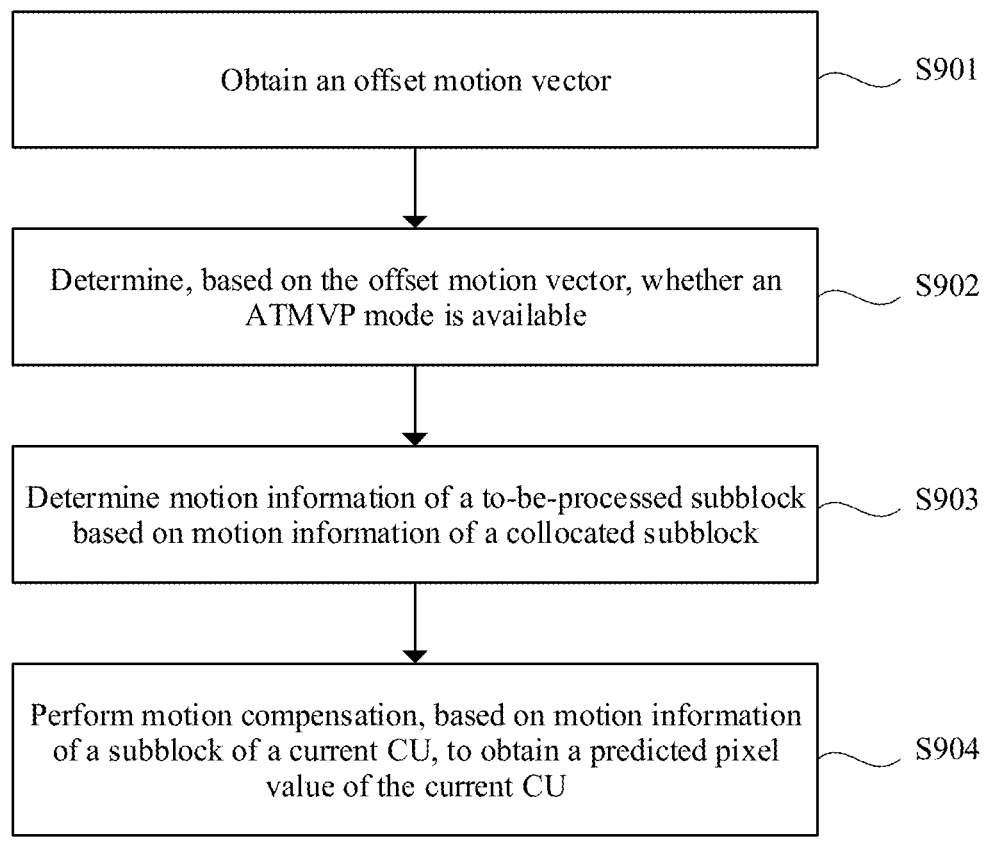
FIG. 9 is a flowchart of an example of an inter prediction method for implementing an embodiment of the disclosure.

As shown in FIG. 9, in an implementation, a method includes the following steps.

S901: Obtain an offset motion vector (offset motion vector).

The offset motion vector is used to determine a position of a point that corresponds to a preset position point in a current CU (that is, a current to-be-processed CU, or may also be referred to as a to-be-processed block, a to-be-encoded block, a to-be-decoded block, or the like) and that is in a collocated picture (collocated picture). A motion vector of a spatially neighboring block of the current CU may be used as the offset motion vector. A collocated picture of a frame in which the current CU is located may be obtained by parsing a bitstream, or may be a picture having a preset value (the preset value is the same at an encoder side and a decoder side). For example, it is assumed that the collocated picture is a picture whose reference frame index is 0 in a reference frame list of the current CU. In some implementations, a position of the current CU in a collocated picture block may also be determined based on the offset motion vector and the collocated picture block. A block at the position may be referred to as a collocated block (corresponding/collocated block).

For example, the offset motion vector may be obtained by using any one of the following methods.

Method 1: Determine whether a motion vector of A1 in FIG. 6 is available. It should be understood that, that the motion vector is available means that the motion vector exists and can be obtained. For example, the motion vector of the neighboring block is unavailable when the neighboring block does not exist, the neighboring block and the current block are not in a same coding region (for example, a slice (slice), a tile (tile), or a tile group (tile group)), or an intra prediction mode or an intra block copy mode (intra block copy, IBC) is used for the neighboring block. Conversely, the motion vector of the neighboring block is available when an inter prediction mode is used for the neighboring block, or when an inter prediction mode is used for the neighboring block and the neighboring block and the current block are in a same coding region.

For the intra block copy mode, an intra block copy coding tool is used in an extended standard such as the screen content coding standard (screen content coding, SCC) of the HEVC, and is mainly used to increase coding efficiency of a screen content video. The IBC mode is a block-level coding mode. At the encoder side, a block matching method is used to find an optimal block vector or motion vector for each CU. The motion vector herein is mainly used to represent a displacement from the current block to a reference block, and is also referred to as a displacement vector (displacement vector). The reference block is a reconstructed block in a current picture. The IBC mode may be considered as a third prediction mode other than the intra prediction mode or the inter prediction mode. To save storage space and reduce complexity of a decoder, in some implementations, the IBC mode allows only a reconstructed part in a predefined region of a current CTU to be used for prediction.

When A1 is unavailable, a zero motion vector may be used as the offset motion vector of the current CU.

It is assumed that A1 may have a first direction motion vector that is based on a first reference frame list 0 and a second direction motion vector that is based on a second reference frame list 1.

When A1 is available, if A1 meets all of the following conditions (1) to (5), the second direction motion vector that is of A1 and that is based on the list 1 is used as the offset motion vector of the current CU. The conditions are as follows.

(1) A reference frame in the list 1 is used for A1 for prediction.

(2) The reference frame in the list 1 of A1 used for prediction is the same as a collocated picture of an image frame in which the current CU is located.

For example, it may be determined whether a POC of the reference frame in the list 1 is the same as a POC of the collocated picture of the image frame in which the current CU is located, where information representing the collocated picture may be obtained by parsing the bitstream.

(3) A low-latency coding structure is used, and reference frames of a to-be-encoded/decoded/processed picture are all displayed before the to-be-encoded/decoded/processed picture.

(4) A picture type of a picture in which the current CU is located is a B picture, a tile in which the current CU is located is a B tile, or a tile group (tile group) in which the current CU is located is a B tile group.

(5) A collocated picture of the picture in which the current CU is located is obtained from the list 1. For example, a value of a syntax element collocated_from_l0 flag is 0.

Otherwise, when A1 is available but does not meet at least one of the foregoing conditions, if A1 meets the following conditions (6) and (7), the first direction motion vector that is of A1 and that is based on the list 0 is used as the offset motion vector of the current CU. The conditions are as follows.

(6) A reference frame in the list 0 is used for A1 for prediction.

(7) The reference frame in the list 0 of A1 used for prediction is the same as the collocated picture of the image frame in which the current CU is located.

Method 2: Find a motion vector of a first available neighboring block in a sequence of A1, B1, B0, and A0 in FIG. 6. If a reference frame of the neighboring block is a collocated picture of a frame in which the current CU is located, that is, the found motion vector points to the collocated picture, the motion vector of the neighboring block is used as the offset motion vector of the current CU. Otherwise, if a reference frame of the neighboring block is not a collocated picture of a frame in which the current CU is located, in an implementation, a zero motion vector may be used as the offset motion vector of the current CU. In another implementation, the motion vector of the first available neighboring block is scaled based on a POC of the collocated picture, a POC of a picture in which the current CU is located, and a POC of the reference frame of the first available neighboring block, so that a scaled motion vector points to the collocated picture; and the scaled motion vector is used as the offset motion vector of the current CU. For a specific scaling method, refer to a method for obtaining a temporal motion vector in the conventional technology, or a scaling method in step 1005 in this embodiment. Details are not described.

It should be understood that, when the offset motion vector is the zero motion vector, a picture block that is in the collocated picture and that is at a same position as the current CU is a collocated block of the current CU in the collocated picture.

When the offset motion vector of the current CU that meets the condition cannot be obtained by using the foregoing method, a motion vector of a subblock of the current CU is not obtained by using an ATMVP prediction mode.

S902: Determine, based on the offset motion vector, whether the ATMVP mode is available.

It is assumed that a picture block in which the point that corresponds to the preset position point in the current CU and that is in the collocated picture is a subblock S, and a coordinate position of the subblock S is ($x_{col}$, $y_{col}$). For example, $$\begin{cases} x_{col} = x + \dfrac{W}{2} + x_{off} \\ y_{col} = y + \dfrac{H}{2} + y_{off} \end{cases} \quad (2)$$

(x, y) represents coordinates of a top-left corner of the current CU, W represents the width of the current CU, H represents the height of the current CU, and ($x_{off}$, $y_{off}$) represents the offset motion vector.

When a prediction mode of the subblock S is the intra prediction mode or the intra block copy mode, it is determined that the ATMVP mode is unavailable, and step 902 and subsequent steps are not performed.

When a prediction mode of the subblock S is the inter prediction mode, it is determined that the ATMVP mode is available. Further, motion information of the subblock S, such as motion information corresponding to the coordinate position ($x_{col}$, $y_{col}$), is obtained, and is determined as an initial default motion vector.

The initial default motion vector MV is scaled, to obtain a default motion vector (MV) of a to-be-processed subblock.

Figure 10:
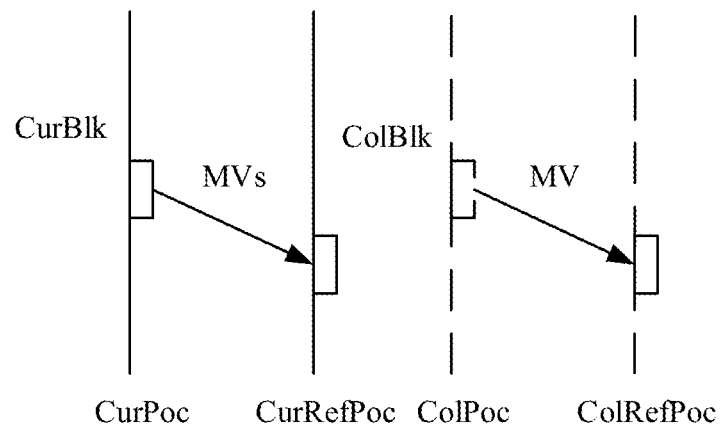
FIG. 10 is a diagram of an example of motion vector scaling processing for implementing an embodiment of the disclosure.

For example, as shown in FIG. 10, the MV may be obtained according to a formula (3):

$$MV_s = \frac{CurPoc - CurRefPoc}{CurPoc - CurRefPoc} \times MV \qquad (3)$$

CurPoc represents a POC of the frame in which the current CU is located, ColPoc represents the POC of the collocated picture, CurRefPoc represents a POC of the reference frame of the current CU, and ColRefPoc represents a POC of a reference frame of the subblock S.

It should be understood that the MV includes a motion vector MVx in a horizontal direction and a motion vector MVy in a vertical direction, and a scaled motion vector MVsx in the horizontal direction and a scaled motion vector MVsy in the vertical direction may be separately obtained through calculation according to the foregoing formula.

S903: Determine motion information of the to-be-processed subblock based on motion information of a collocated subblock.

Figure 11:
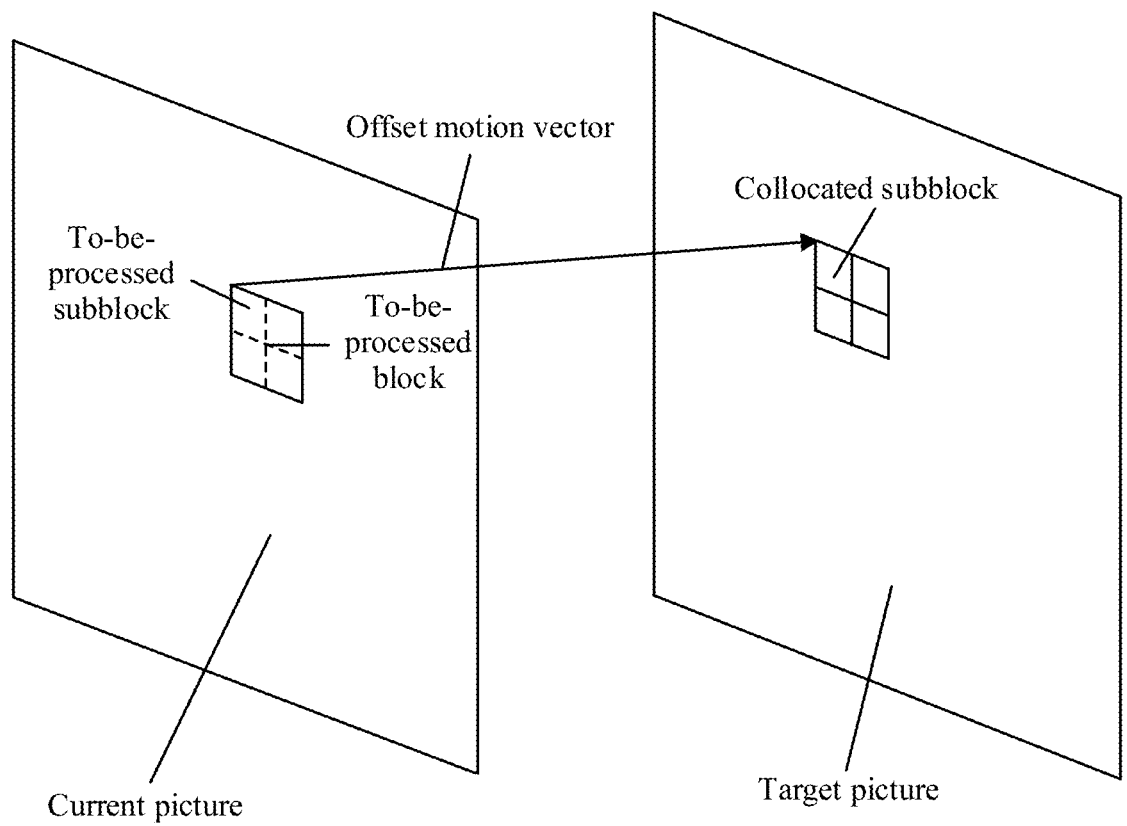
FIG. 11 is a diagram of an example of a subblock of a to-be-processed block and a collocated subblock of the subblock that are used for implementing an embodiment of the disclosure.

For example, as shown in FIG. 11, the to-be-processed block, that is, the current CU, is located in the current picture, the to-be-processed block includes four subblocks, and one to-be-processed subblock is a top-left subblock of the to-be-processed block. In this case, a subblock at a top-left position in the collocated picture may be determined as a collocated subblock of the to-be-processed subblock. It should be understood that different collocated subblocks may exist in a form of one collocated block as a whole, or may exist in a form of separate subblocks.

For example, motion information corresponding to a geometric center position of the collocated subblock may be obtained. A center position $(x_{(i,j)}, y_{(i,j)})$ of a collocated subblock of an $(i, j)^{th}$ to-be-processed subblock (that is, a subblock that is an $i^{th}$ subblock from left to right and a $j^{th}$ subblock from top to bottom) of the current CU may be obtained according to a formula (4).

$$\begin{cases} x_{(i,j)} = x + M \times i + \dfrac{M}{2} + x_{off} \\ y_{(i,j)} = y + N \times j + \dfrac{N}{2} + y_{off} \end{cases} \qquad (4)$$

(x, y) represents coordinates of a top-left corner of the current CU, M represents the width of the to-be-processed subblock, and H represents the height of the to-be-processed subblock.

A prediction mode of a picture block in which the center position is located is determined.

When the prediction mode of the picture block is the inter prediction mode, a motion vector at the center position is available, and the motion vector at the position is obtained. Scaling processing is performed on the motion vector based on a temporal relationship between an image frame in which the to-be-processed subblock is located and an image frame in which the collocated subblock is located, to obtain a motion vector of the to-be-processed subblock. A scaling processing method is similar to that in the formula (2). For example, $$MV_R = \frac{CurPoc - CurRefPoc}{CurPoc - CurRefPoc} \times MV \qquad (5)$$

MV represents the motion vector at the center position, and $MV_R$ represents the motion vector of the to-be-processed subblock.

In an implementation, the POC CurRefPoc of the reference frame of the current CU may be preset to a POC of a reference frame whose reference frame index is 0 in the reference picture list of the frame in which the current CU is located.

It should be understood that CurRefPoc may alternatively be another reference frame in the reference picture list of the frame in which the current CU is located, and this is not limited.

When the prediction mode of the picture block is the intra prediction mode or the intra block copy mode, the motion vector at the center position is unavailable, and the default motion vector (MV) of the to-be-processed subblock that is determined in step S902 is used as the motion vector of the to-be-processed subblock.

S904: Perform motion compensation based on the motion information of the subblock of the current CU, to obtain a predicted pixel value of the current CU.

For each subblock, motion compensation is performed based on the motion vector determined in step 903 and the reference frame of the picture in which the current CU is located, for example, the motion vector $MV_R$ and the reference frame CurRefPoc, to obtain a predicted pixel value of the subblock. For a motion compensation process, refer to the foregoing description or any improvement solution in the conventional technology. Details are not described again.

The current CU includes subblocks. Therefore, after a predicted pixel value of each subblock is obtained in the foregoing manner, the predicted pixel value of the current CU is obtained.

In this implementation, the motion vector of each subblock is obtained, so that a more complex motion situation inside the to-be-processed block can be reflected. This improves accuracy of the motion vector and also increases coding efficiency. However, when the motion information of the collocated subblock is unavailable, default motion information needs to be calculated. This affects a coding speed.

Figure 12:
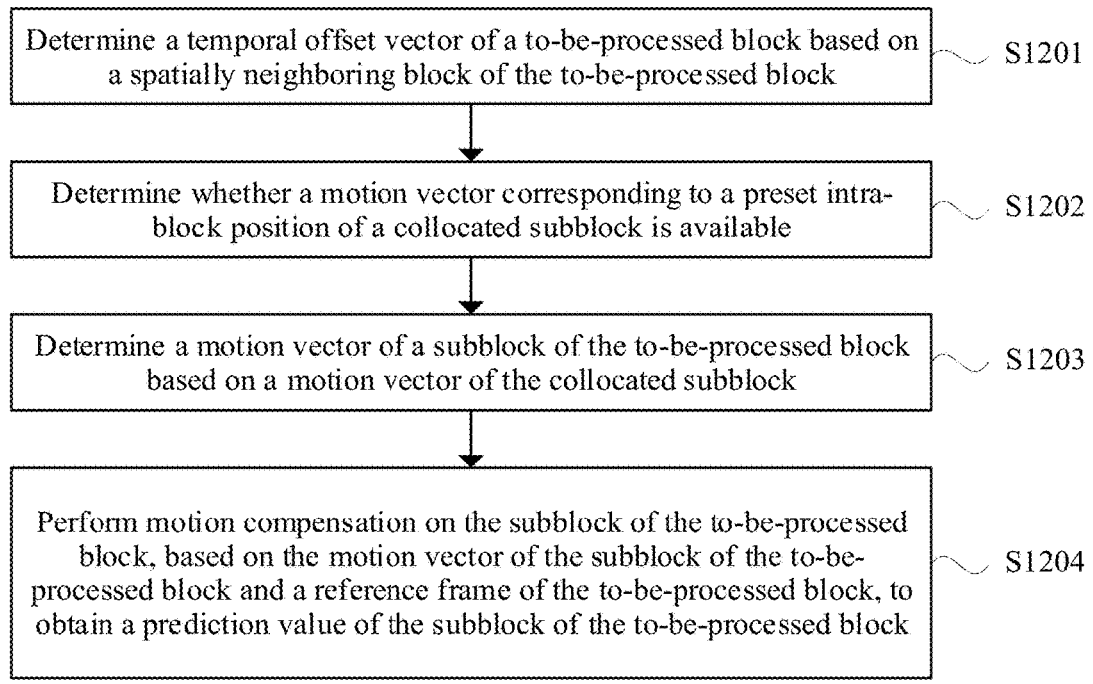
FIG. 12 is a flowchart of an example of another inter prediction method for implementing an embodiment of the disclosure.

As shown in FIG. 12, in another implementation, a to-be-processed block includes one or more subblocks, and identification information of a collocated picture of the to-be-processed block is obtained by parsing a bitstream. When a motion vector of a spatially neighboring block at a preset position of the to-be-processed block is available and a reference frame corresponding to the motion vector is a collocated picture, the motion vector is determined as a temporal offset vector. A position of a collocated subblock of the subblock of the to-be-processed block is determined in the collocated picture based on the temporal offset vector. Whether a motion vector of the collocated subblock is available is determined, and a motion vector of the subblock of the to-be-processed block is determined based on the motion vector of the collocated subblock. The inter prediction method in some embodiments includes the following steps.

S1201: Determine the temporal offset vector of the to-be-processed block based on the spatially neighboring block of the to-be-processed block.

The temporal offset vector is used to determine the collocated subblock of the subblock of the to-be-processed block.

It should be understood that, for example, as shown in FIG. 11, the to-be-processed block includes four to-be-processed subblocks, and a collocated subblock of each subblock of the to-be-processed block is determined in the collocated picture (which is denoted as a target picture, that is, a picture in which the collocated subblock is located) based on a position of the subblock of the to-be-processed block in a current picture and the temporal offset vector (which is denoted as an offset motion vector in the figure).

An index that is of an image frame (the collocated picture) in which the collocated subblock is located and that is in a reference frame list of the spatially neighboring block of the to-be-processed block is obtained by parsing the bitstream. A decoder side may determine the collocated picture by parsing corresponding information in the bitstream; and an encoder side may determine, in an RDO selection manner, an image frame with optimal performance as the collocated picture, or specify a frame as the collocated picture, and write indication information of the collocated picture into the bit stream. Alternatively, the collocated picture may be preset by the encoder side and the decoder side according to a protocol.

In an implementation, step 1201 may be as follows:
sequentially checking, in a preset order, whether motion vectors of spatially neighboring blocks at a plurality of first preset positions are available, until a motion vector of a first spatially neighboring block whose motion vector is available in the preset order is obtained; and
using, as the temporal offset vector, the motion vector of the first spatially neighboring block whose motion vector is available in the preset order.

A second preset motion vector is used as the temporal offset vector when the motion vectors of the spatially neighboring blocks at the plurality of first preset positions are all unavailable.

For example, as shown in FIG. 6, whether motion vectors of spatially neighboring blocks A1, B1, B0, and A0 of the to-be-processed block are available may be sequentially checked, until a first spatially neighboring block whose motion vector is available is found. It is assumed that the first spatially neighboring block is B0. In this case, the check is stopped, and a motion vector of B0 is used as the temporal offset vector.

In an implementation, scaling processing may be further performed on the motion vector of B0 based on a temporal relationship between a reference frame of B0, an image frame in which the to-be-processed block is located, and the collocated picture of the to-be-processed block, so that a scaled motion vector uses the collocated picture as a reference frame.

The second preset motion vector, that is, a zero motion vector, may be used as the temporal offset vector when the motion vectors of the spatially neighboring blocks are all unavailable.

It should be understood that the spatially neighboring block at the first preset position is preset by the encoder side and the decoder side according to a protocol or is determined by the encoder side and the decoder side based on a higher-level syntax element. This is not limited in this embodiment of this application.

A condition that the motion vector of the spatially neighboring block is unavailable includes one or a combination of the following items: The spatially neighboring block is not encoded/decoded (if the prediction method is implemented at the encoder side, the spatially neighboring block is not encoded, or if the prediction method is implemented at the decoder side, the spatially neighboring block is not decoded); an intra prediction mode or an intra block copy mode is used for the spatially neighboring block; the spa- tially neighboring block does not exist; or the spatially neighboring block and the to-be-processed block are located in different coding regions.

For example, the coding region includes a picture, a slice (slice), a tile (tile), or a tile group (tile group).

In another implementation, step 1201 may alternatively be as follows:
obtaining a motion vector and a reference frame of a spatially neighboring block at a second preset position, where the motion vector of the spatially neighboring block at the second preset position is available; and
using the motion vector of the spatially neighboring block at the second preset position as the temporal offset vector.

A third preset motion vector is used as the temporal offset vector when the motion vector of the spatially neighboring block at the second preset position is unavailable.

In some implementations, the spatially neighboring block at the second preset position further meets a condition that the reference frame of the spatially neighboring block is the same as the collocated picture is located.

For example, as shown in FIG. 6, it is assumed that the spatially neighboring block at the second preset position is A1.

It should be understood that, the motion vector of the spatially neighboring block at the second preset position includes a first direction motion vector that is based on a first reference frame list, and the reference frame of the spatially neighboring block at the second preset position includes a first direction reference frame corresponding to the first direction motion vector.

In an implementation, the using the motion vector of the spatially neighboring block at the second preset position as the temporal offset vector includes using the first direction motion vector as the temporal offset vector when the first direction reference frame is the same as the image frame in which the collocated subblock is located; or using the third preset motion vector as the temporal offset vector when the first direction reference frame is different from the image frame in which the collocated subblock is located.

For example, the third preset motion vector is a zero motion vector.

It should be understood that, when bidirectional prediction is used for the spatially neighboring block at the second preset position, the motion vector of the spatially neighboring block at the second preset position further includes a second direction motion vector that is based on a second reference frame list, and the reference frame of the spatially neighboring block at the second preset position includes a second direction reference frame corresponding to the second direction motion vector.

In another implementation, the using the motion vector of the spatially neighboring block at the second preset position as the temporal offset vector includes using the first direction motion vector as the temporal offset vector when the first direction reference frame is the same as the image frame in which the collocated subblock is located; or when the first direction reference frame is different from the image frame in which the collocated subblock is located, determining whether the second direction reference frame is the same as the image frame in which the collocated subblock is located; and using the second direction motion vector as the temporal offset vector when the second direction reference frame is the same as the image frame in which the collocated subblock is located; or using the third preset motion vector as the temporal offset vector when the second direction reference frame is different from the image frame in which the collocated subblock is located. Optionally, before the determining whether the second direction reference frame is the same as the image frame in which the collocated subblock is located, the method further includes: determining whether a type of a coding region in which the spatially neighboring block is located is a B type, that is, whether the coding region is a B frame, a B tile, a B slice, or a B tile group.

In another implementation, when bidirectional prediction is used for the spatially neighboring block at the second preset position, the using the motion vector of the spatially neighboring block at the second preset position as the temporal offset vector includes when the image frame in which the collocated subblock is located is obtained from the second reference frame list, determining whether the second direction reference frame is the same as the image frame in which the collocated subblock is located, and using the second direction motion vector as the temporal offset vector when the second direction reference frame is the same as the image frame in which the collocated subblock is located, or using the first direction motion vector as the temporal offset vector when the second direction reference frame is different from the image frame in which the collocated subblock is located and the first direction reference frame is the same as the image frame in which the collocated subblock is located; or when the image frame in which the collocated subblock is located is obtained from the first reference frame list, determining whether the first direction reference frame is the same as the image frame in which the collocated subblock is located, and using the first direction motion vector as the temporal offset vector when the first direction reference frame is the same as the image frame in which the collocated subblock is located, or using the second direction motion vector as the temporal offset vector when the first direction reference frame is different from the image frame in which the collocated subblock is located and the second direction reference frame is the same as the image frame in which the collocated subblock is located. In addition, the third preset motion vector is used as the temporal offset vector when the second direction reference frame is different from the image frame in which the collocated subblock is located and the first direction reference frame is different from the image frame in which the collocated subblock is located.

In another implementation, when bidirectional prediction is used for the spatially neighboring block at the second preset position, the using the motion vector of the spatially neighboring block at the second preset position as the temporal offset vector comprises when the image frame in which the collocated subblock is located is obtained from the second reference frame list, and all reference frames in a reference frame list of the to-be-processed block are displayed before the image frame in which the to-be-processed block is located, determining whether the second direction reference frame is the same as the image frame in which the collocated subblock is located, and using the second direction motion vector as the temporal offset vector when the second direction reference frame is the same as the image frame in which the collocated subblock is located, or using the first direction motion vector as the temporal offset vector when the second direction reference frame is different from the image frame in which the collocated subblock is located and the first direction reference frame is the same as the image frame in which the collocated subblock is located; or when the image frame in which the collocated subblock is located is obtained from the first reference frame list, or at least one reference frame in a reference frame list of the to-be-processed block is displayed after the image frame in which the to-be-processed block is located, determining whether the first direction reference frame is the same as the image frame in which the collocated subblock is located, and using the first direction motion vector as the temporal offset vector when the first direction reference frame is the same as the image frame in which the collocated subblock is located, or using the second direction motion vector as the temporal offset vector when the first direction reference frame is different from the image frame in which the collocated subblock is located and the second direction reference frame is the same as the image frame in which the collocated subblock is located. In addition, the third preset motion vector is used as the temporal offset vector when the second direction reference frame is different from the image frame in which the collocated subblock is located and the first direction reference frame is different from the image frame in which the collocated subblock is located.

For example, whether the image frame in which the collocated subblock is located is obtained from the first/second reference frame list may be determined by parsing a syntax element collocated_from_l0_flag in the bitstream. Collocated_from_l0_flag equal to 1 specifies that the image frame (the collocated picture) in which the collocated subblock is located is obtained from the first reference frame list; and collocated_from_l0_flag equal to 0 specifies that the image frame in which the collocated subblock is located is obtained from the second reference frame list. When the bitstream does not carry information about collocated_from_l0_flag, the image frame in which the collocated subblock is located is obtained from the first reference frame list by default.

For example, all the reference frames in the reference frame list of the to-be-processed block are displayed before the image frame in which the to-be-processed block is located, that is, a low-latency frame coding structure is used. In this coding structure, when each frame of picture is encoded, all used reference frames are displayed before a current to-be-encoded frame. Correspondingly, at the decoder side, all used reference frames are displayed before a current to-be-decoded frame.

It should be understood that, when the type of the coding region in which the spatially neighboring block is located is not the B type, bidirectional prediction is not used for the spatially neighboring block, and an implementation in which bidirectional prediction is used may not achieve a good technical effect. Therefore, optionally, before the foregoing implementation in which bidirectional prediction is used is performed, whether the coding region in which the spatially neighboring block is located is the B type may be determined.

S1202: Determine whether a motion vector corresponding to a preset intra-block position of the collocated subblock is available.

A position of a collocated subblock of a subblock (which is referred to as an example subblock) in the to-be-processed block may be determined in the collocated picture based on position coordinates of the subblock of the to-be-processed block and the temporal offset vector that is determined in step S1201. For example, the position of the collocated subblock may be obtained according to the formula (4) in this specification. With reference to the formula (4), x and y respectively represent a horizontal coordinate and a vertical coordinate of a top-left corner of the to-be-processed block; i and j represent that the example subblock is a subblock that is arranged in the to-be-processed block and that is an $i^{th}$ subblock from left to right and a $j^{th}$ subblock from top to bottom; $x_{off}$ and $y_{off}$ respectively represent a horizontal coordinate and a vertical coordinate of the temporal offset vector; M and N respectively represent the width and the height of the subblock; and $x_{(i,j)}$ and $y_{(i,j)}$ represent position coordinates of the collocated subblock of the example subblock (which is referred to as a collocated subblock for short).

It should be understood that M/2 and N/2 in the formula (4) represent that the preset intra-block position is a geometric center position of the collocated subblock. The preset intra-block position may alternatively be another intra-block position such as a top-left corner of the collocated subblock. This is not limited.

The motion vector corresponding to the preset intra-block position of the collocated subblock may also be used as the motion vector of the collocated subblock.

A prediction unit in the collocated picture in which the position coordinates $(x_{(i,j)}, y_{(i,j)})$ are located may be determined based on the position coordinates, and whether the motion vector corresponding to the preset intra-block position of the collocated subblock is available may be determined based on prediction information of the prediction unit.

It should be understood that the prediction unit is a result obtained after the collocated picture is actually encoded, and may be inconsistent with the collocated subblock.

For example, when a prediction mode of the prediction unit is an inter prediction mode, the motion vector corresponding to the preset intra-block position is available; or when a prediction mode of the prediction unit is an intra prediction mode or an intra block copy mode, the motion vector corresponding to the preset intra-block position is unavailable.

In an implementation, prediction mode information of the prediction unit may be checked, and it is determined, based on the prediction mode information, that the prediction mode of the prediction unit is the intra prediction mode, the inter prediction mode, the intra block copy mode, or another mode.

In another implementation, motion information of the prediction unit may be checked, for example, a prediction direction may be checked. When a prediction direction flag predFlagL0 and/or the predFlagL1 is 1, the prediction mode is the inter prediction mode. Otherwise, the prediction mode is the intra prediction mode, or another prediction mode in which the motion vector is unavailable.

S1203: Determine the motion vector of the subblock of the to-be-processed block based on the motion vector of the collocated subblock.

The motion vector of the subblock of the to-be-processed block is obtained based on a first preset motion vector when the motion vector of the collocated subblock is unavailable.

When the prediction mode of the prediction unit is the inter prediction mode, the motion vector corresponding to the preset intra-block position is available, and the motion vector of the subblock of the to-be-processed block is obtained based on the motion vector corresponding to the preset intra-block position.

Scaling processing may be performed, based on a ratio of a first temporal distance difference to a second temporal distance difference, on the motion vector corresponding to the preset intra-block position, to obtain the motion vector of the subblock of the to-be-processed block, where the first temporal distance difference is a picture order count difference between the image frame in which the to-be-processed block is located and a reference frame of the to-be-processed block, and the second temporal distance difference is a picture order count difference between the image frame in which the collocated subblock is located and a reference frame of the collocated subblock. For a specific calculation procedure for scaling processing, for example, refer to the formula (3) in this specification. Details are not described again.

An index of the reference frame of the to-be-processed block in the reference frame list of the to-be-processed block is obtained by parsing the bitstream. The decoder side may determine the reference frame of the to-be-processed block by parsing corresponding information in the bitstream; and the encoder side may determine, in an RDO selection manner, an image frame with optimal performance as the reference frame of the to-be-processed block, or specify a frame as the reference frame of the to-be-processed block, and write indication information of the reference frame of the to-be-processed block into the bit stream. Alternatively, the reference frame of the to-be-processed block may be preset by the encoder side and the decoder side according to a protocol. For example, the index of the reference frame of the to-be-processed block in the reference frame list of the to-be-processed block is 0.

It should be understood that the motion vector corresponding to the preset intra-block position may be directly obtained from a motion vector storage unit corresponding to the position, may be obtained from a motion vector storage unit corresponding to a neighboring position, or may be obtained through interpolation filtering based on a motion vector in a motion vector storage unit corresponding to a neighboring position. This is not limited.

When the prediction mode of the prediction unit is the intra prediction mode or the intra block copy mode, the motion vector corresponding to the preset intra-block position is unavailable, and the motion vector of the subblock of the to-be-processed block is obtained based on the first preset motion vector.

In an implementation, the motion vector of the subblock includes a first direction subblock motion vector that is based on the first reference frame list and/or a second direction subblock motion vector that is based on the second reference frame list; and when the motion vector corresponding to the preset intra-block position is unavailable, that the motion vector of the subblock of the to-be-processed block is obtained based on the first preset motion vector comprising determining that unidirectional prediction based on the first direction subblock motion vector is used for the subblock of the to-be-processed block, and obtaining the first direction subblock motion vector of the subblock of the to-be-processed block based on the first preset motion vector; or determining that unidirectional prediction based on the second direction subblock motion vector is used for the subblock of the to-be-processed block, and obtaining the second direction subblock motion vector of the subblock of the to-be-processed block based on the first preset motion vector.

In another implementation, the motion vector of the subblock includes a first direction subblock motion vector that is based on the first reference frame list and a second direction subblock motion vector that is based on the second reference frame list; and when the motion vector corresponding to the preset intra-block position is unavailable, that the motion vector of the subblock of the to-be-processed block is obtained based on the first preset motion vector comprising when a prediction type of a coding region in which the to-be-processed block is located is B type prediction, determining that bidirectional prediction is used for the subblock of the to-be-processed block, and separately obtaining the first direction subblock motion vector of the subblock of the to-be-processed block and the second direction subblock motion vector of the subblock of the to-be-processed block based on the first preset motion vector; or when a prediction type of a coding region in which the to-be-processed block is located is P type prediction, determining that unidirectional prediction is used for the subblock of the to-be-processed block, and obtaining the first direction subblock motion vector of the subblock of the to-be-processed block based on the first preset motion vector.

For example, the coding region includes a picture, a slice, a tile, or a tile group.

In an implementation, that the motion vector of the subblock of the to-be-processed block is obtained based on a first preset motion vector includes: using the first preset motion vector as the motion vector of the subblock of the to-be-processed block.

In an implementation, the first preset motion vector is a zero motion vector.

For example, a first direction prediction flag predFlagL0 may be set to 1, a second direction prediction flag predFlagL1 may be set to 0, and the first direction subblock motion vector mvL0 may be set to (0, 0).

Alternatively, a first direction prediction flag predFlagL0 may be set to 0, a second direction prediction flag predFlagL1 may be set to 1, and the second direction subblock motion vector mvL1 may be set to (0, 0).

Alternatively, when a coding region in which the example subblock is located is a B frame, a B slice, a B tile, or a B tile group, a first direction prediction flag predFlagL0 may be set to 1, a second direction prediction flag predFlagL1 may be set to 1, the first direction subblock motion vector mvL0 may be set to (0, 0), and the second direction subblock motion vector mvL1 may be set to (0, 0). Otherwise (when a coding region in which the example subblock is located does not correspond to the foregoing bidirectional prediction region), the first direction prediction flag predFlagL0 may be set to 1, the second direction prediction flag predFlagL1 may be set to 0, and the first direction subblock motion vector mvL0 may be set to (0, 0).

S1204: Perform motion compensation on the subblock of the to-be-processed block based on the motion vector of the subblock of the to-be-processed block and the reference frame of the to-be-processed block, to obtain a prediction value of the subblock of the to-be-processed block.

It should be understood that, the foregoing procedure of processing the example subblock is performed on each subblock in the to-be-processed block, to obtain a prediction value of each subblock. The to-be-processed block includes subblocks. Therefore, after the prediction value of each subblock is determined, a prediction value of the to-be-processed block is correspondingly determined.

In this embodiment, several simplified methods for obtaining the temporal offset vector are provided. This reduces calculation complexity while ensuring accuracy of obtaining the collocated subblock. In addition, a manner of determining the motion vector of the subblock of the corresponding to-be-processed block when the collocated subblock is unavailable is simplified, and calculation complexity is further reduced.

Figure 13:
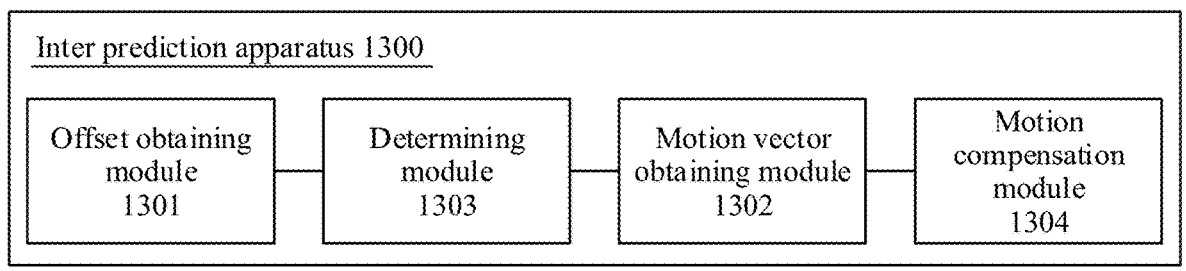
FIG. 13 is a diagram of an example of an inter prediction apparatus for implementing an embodiment of the disclosure.

As shown in FIG. 13, a to-be-processed block includes one or more subblocks. An inter prediction apparatus 1300 includes: an offset obtaining module 1301, configured to determine a temporal offset vector of the to-be-processed block based on a spatially neighboring block of the to-be-processed block, where the temporal offset vector is used to determine a collocated subblock of the subblock of the to-be-processed block; and a motion vector obtaining module 1302, configured to determine a motion vector of the subblock of the to-be-processed block based on a motion vector of the collocated subblock, where the motion vector of the subblock of the to-be-processed block is obtained based on a first preset motion vector when the motion vector of the collocated subblock is unavailable.

In an implementation, the offset obtaining module 1301 is configured to: sequentially check, in a preset order, whether motion vectors of spatially neighboring blocks at a plurality of first preset positions are available, until a motion vector of a first spatially neighboring block whose motion vector is available in the preset order is obtained; and use, as the temporal offset vector, the motion vector of the first spatially neighboring block whose motion vector is available in the preset order.

In an implementation, the offset obtaining module 1301 is configured to use a second preset motion vector as the temporal offset vector when the motion vectors of the spatially neighboring blocks at the plurality of first preset positions are all unavailable.

In an implementation, the second preset motion vector is a zero motion vector.

In an implementation, the offset obtaining module 1301 is configured to: obtain a motion vector and a reference frame of a spatially neighboring block at a second preset position, where the motion vector of the spatially neighboring block at the second preset position is available; and use the motion vector of the spatially neighboring block at the second preset position as the temporal offset vector.

In an implementation, the offset obtaining module 1301 is configured to use a third preset motion vector as the temporal offset vector when the motion vector of the spatially neighboring block at the second preset position is unavailable.

In an implementation, the third preset motion vector is a zero motion vector.

In an implementation, the motion vector of the spatially neighboring block at the second preset position includes a first direction motion vector that is based on the first reference frame list, and the reference frame of the spatially neighboring block at the second preset position includes a first direction reference frame corresponding to the first direction motion vector; and the offset obtaining module 1301 is configured to use the first direction motion vector as the temporal offset vector when the first direction reference frame is the same as an image frame in which the collocated subblock is located.

In an implementation, when the first direction reference frame is different from the image frame in which the collocated subblock is located, the offset obtaining module 1301 is configured to use the third preset motion vector as the temporal offset vector.

In an implementation, when bidirectional prediction is used for the spatially neighboring block at the second preset position, the motion vector of the spatially neighboring block at the second preset position further includes a second direction motion vector that is based on the second reference frame list, and the reference frame of the spatially neighboring block at the second preset position includes a second direction reference frame corresponding to the second direction motion vector; and when the first direction reference frame is different from the image frame in which a corresponding temporal block of the to-be-processed block is located, the offset obtaining module 1301 is configured to: use the second direction motion vector as the temporal offset vector when the second direction reference frame is the same as the image frame in which the collocated subblock is located, or use the third preset motion vector as the temporal offset vector when the second direction reference frame is different from the image frame in which the collocated subblock is located.

In an implementation, when bidirectional prediction is used for the spatially neighboring block at the second preset position, the motion vector of the spatially neighboring block at the second preset position includes a first direction motion vector that is based on the first reference frame list and a second direction motion vector that is based on the second reference frame list, and the reference frame of the spatially neighboring block at the second preset position includes a first direction reference frame corresponding to the first direction motion vector and a second direction reference frame corresponding to the second direction motion vector; and the offset obtaining module 1301 is configured to: when an image frame in which the collocated subblock is located is obtained from the second reference frame list, use the second direction motion vector as the temporal offset vector when the second direction reference frame is the same as the image frame in which the collocated subblock is located, or use the first direction motion vector as the temporal offset vector when the second direction reference frame is different from the image frame in which the collocated subblock is located and the first direction reference frame is the same as the image frame in which the collocated subblock is located; or when an image frame in which the collocated subblock is located is obtained from the first reference frame list, use the first direction motion vector as the temporal offset vector when the first direction reference frame is the same as the image frame in which the collocated subblock is located, or use the second direction motion vector as the temporal offset vector when the first direction reference frame is different from the image frame in which the collocated subblock is located and the second direction reference frame is the same as the image frame in which the collocated subblock is located.

In an implementation, the offset obtaining module 1301 is configured to: when the image frame in which the collocated subblock is located is obtained from the second reference frame list, and all reference frames in a reference frame list of the to-be-processed block are displayed before an image frame in which the to-be-processed block is located, use the second direction motion vector as the temporal offset vector when the second direction reference frame is the same as the image frame in which the collocated subblock is located, or use the first direction motion vector as the temporal offset vector when the second direction reference frame is different from the image frame in which the collocated subblock is located and the first direction reference frame is the same as the image frame in which the collocated subblock is located; or when the image frame in which the collocated subblock is located is obtained from the first reference frame list, or at least one reference frame in a reference frame list of the to-be-processed block is displayed after an image frame in which the to-be-processed block is located, use the first direction motion vector as the temporal offset vector when the first direction reference frame is the same as the image frame in which the collocated subblock is located, or use the second direction motion vector as the temporal offset vector when the first direction reference frame is different from the image frame in which the collocated subblock is located and the second direction reference frame is the same as the image frame in which the collocated subblock is located.

In an implementation, the offset obtaining module 1301 is configured to use the third preset motion vector as the temporal offset vector when the second direction reference frame is different from the image frame in which the collocated subblock is located and the first direction reference frame is different from the image frame in which the collocated subblock is located.

In an implementation, an index that is of the image frame in which the collocated subblock is located and that is in a reference frame list of the spatially neighboring block of the to-be-processed block is obtained by parsing a bitstream.

In an implementation, a condition that the motion vector of the spatially neighboring block is unavailable includes one or a combination of the following items: The spatially neighboring block is not encoded/decoded; an intra prediction mode or an intra block copy mode is used for the spatially neighboring block; the spatially neighboring block does not exist; or the spatially neighboring block and the to-be-processed block are located in different coding regions.

In an implementation, the coding region includes a picture, a slice, a tile, or a tile group.

In an implementation, the apparatus further includes: a determining module 1303, configured to determine whether a motion vector corresponding to a preset intra-block position of the collocated subblock is available; and correspondingly, the motion vector obtaining module 1302 is configured to: obtain the motion vector of the subblock of the to-be-processed block based on the motion vector corresponding to the preset intra-block position when the motion vector corresponding to the preset intra-block position is available, or obtain the motion vector of the subblock of the to-be-processed block based on the first preset motion vector when the motion vector corresponding to the preset intra-block position is unavailable.

In an implementation, the preset intra-block position is a geometric center position of the collocated subblock.

In an implementation, when the intra prediction mode or the intra block copy mode is used for a prediction unit in which the preset intra-block position is located, the motion vector corresponding to the preset intra-block position is unavailable; or when inter prediction is used for a prediction unit in which the preset intra-block position is located, the motion vector corresponding to the preset intra-block position is available.

In an implementation, the motion vector obtaining module 1302 is configured to use the first preset motion vector as the motion vector of the subblock of the to-be-processed block.

In an implementation, the first preset motion vector is a zero motion vector.

In an implementation, the motion vector of the subblock includes a first direction subblock motion vector that is based on the first reference frame list and/or a second direction subblock motion vector that is based on the second reference frame list; and when the motion vector corresponding to the preset intra-block position is unavailable, the motion vector obtaining module 1302 is configured to: determine that unidirectional prediction based on the first direction subblock motion vector is used for the subblock of the to-be-processed block, and obtain the first direction subblock motion vector of the subblock of the to-be-processed block based on the first preset motion vector; or determine that unidirectional prediction based on the second direction subblock motion vector is used for the subblock of the to-be-processed block, and obtain the second direction subblock motion vector of the subblock of the to-be-processed block based on the first preset motion vector.

In an implementation, when the motion vector corresponding to the preset intra-block position is unavailable, the motion vector obtaining module 1302 is configured to: when a prediction type of a coding region in which the to-be-processed block is located is B type prediction, determine that bidirectional prediction is used for the subblock of the to-be-processed block, and separately obtain the first direction subblock motion vector of the subblock of the to-be-processed block and the second direction subblock motion vector of the subblock of the to-be-processed block based on the first preset motion vector; or when a prediction type of a coding region in which the to-be-processed block is located is P type prediction, determine that unidirectional prediction is used for the subblock of the to-be-processed block, and obtain the first direction subblock motion vector of the subblock of the to-be-processed block based on the first preset motion vector.

In an implementation, the motion vector obtaining module 1302 is configured to perform, based on a ratio of a first temporal distance difference to a second temporal distance difference, scaling processing on the motion vector corresponding to the preset intra-block position, to obtain the motion vector of the subblock of the to-be-processed block, where the first temporal distance difference is a picture order count difference between the image frame in which the to-be-processed block is located and a reference frame of the to-be-processed block, and the second temporal distance difference is a picture order count difference between the image frame in which the collocated subblock is located and a reference frame of the collocated subblock.

In an implementation, an index of the reference frame of the to-be-processed block in the reference frame list of the to-be-processed block is obtained by parsing the bitstream.

In an implementation, the index of the reference frame of the to-be-processed block in the reference frame list of the to-be-processed block is 0.

In an implementation, the apparatus further includes: a motion compensation module 1304, configured to perform motion compensation on the subblock of the to-be-processed block based on the motion vector of the subblock of the to-be-processed block and the reference frame of the to-be-processed block, to obtain a prediction value of the subblock of the to-be-processed block.

It should be understood that the modules in this embodiment of this application that are shown in FIG. 13 are configured to perform the method shown in FIG. 12 and the feasible implementations, and have a same technical effect.

The following describes, by using examples, some implementations related to the embodiments of this application.

Embodiment A

Step 1: Determine an offset motion vector (offset motion vector).

The offset motion vector (offset motion vector) is used to determine a position of a collocated block of a current CU in a collocated picture (collocated picture). A motion vector of a spatially neighboring block of the current CU may be used as the offset motion vector. A position of the current CU in the collocated picture is determined based on the offset motion vector and a collocated picture of a current frame. A block at the position is referred to as a collocated block (corresponding/collocated block). The offset motion vector may be obtained by using one of the following methods.

Method 1: In an implementation, as shown in FIG. 6, if A1 is available, the offset motion vector is determined according to the following method.

If A1 is unavailable, a value of the offset motion vector is 0. That A1 is unavailable means that if a block at the position A1 is not decoded, the block is not an inter prediction block (is an intra prediction block or an intra block copy (Intra block copy, IBC) block), or if the block is located outside a current slice (slice), tile, tile group (tile group), or picture, it is considered that the block is an unavailable block.

If all the following conditions are met, the offset motion vector of the current block is a motion vector corresponding to a list 1 of A1.

The list 1 is used for A1 for prediction.

A reference frame in the list 1 of A1 used for prediction is the same as the collocated picture (collocated picture) of the current frame. (Whether POCs are the same is determined, an index of the reference frame and an index of the collocated picture correspond to a same POC, and the idx of the collocated picture of the current block may be obtained from the bitstream.)

A low-latency coding structure is used, and only a picture that is displayed before a current picture is used for prediction.

A type of a picture, a tile, or a tile group in which the current block is located is a B type. collocated_from_l0_flag is 0. collocated_from_l0_flag equal to 1 specifies that a collocated picture for temporal motion vector prediction is obtained from a reference picture queue list 0. collocated_from_l0_flag equal to 0 specifies that a collocated picture for temporal motion vector prediction is obtained from a reference picture queue list 1. A value of collocated_from_l0_flag is 1 when collocated_from_l0_flag is not present in the bitstream.

Otherwise, if all the following conditions are met, the offset motion vector is a motion vector corresponding to a list 0 of A1.

The list 0 is used for A1 for prediction.

A reference frame in the list 0 of A1 used for prediction is the same as the collocated picture of the current frame.

Method 2: For example, a motion vector of a first available neighboring block is found in a sequence of A1, B1, B0, and A0 in FIG. 6. If the motion vector points to the collocated picture, the motion vector is used as the offset motion vector of the current CU. Otherwise, a zero motion vector may be used; or the motion vector of the first available neighboring block is scaled, so that the zero motion vector points to the collocated picture, and a scaled motion vector is used as the offset motion vector of the current CU.

It should be understood that the used offset vector may alternatively be a zero offset vector. In this case, a picture block in the collocated picture that is at a same position as the to-be-processed block is a collocated block of the to-be-processed block in the collocated picture. In addition, when a target offset vector that meets a requirement cannot be found, an ATMVP technology may not be used, but another technology is used to obtain a motion vector of a to-be-processed subblock.

Step 2: Obtain availability information and default motion information that are in an ATMVP mode.

The collocated block may be first obtained based on the offset vector, and a prediction mode of a collocated subblock S in which a preset position in the collocated block is located is obtained. Coordinates (xcol, ycol) of the preset position of the collocated block may be obtained according to a formula (6). The default motion information and the availability in the ATMVP mode are obtained based on the prediction mode and motion information of the collocated subblock S. A method is as follows.

Coordinates of the preset position are first determined in the collocated block, to obtain the prediction mode of the subblock corresponding to the preset position is located; and whether the ATMVP is currently available is determined based on the prediction mode of the subblock S corresponding to the preset position is located.

$$\begin{cases} x_{col} = x + \dfrac{W}{2} + x_{off} \\ y_{col} = y + \dfrac{H}{2} + y_{off} \end{cases} \quad (6)$$

(x, y) represents coordinates of a top-left corner of the current CU, $(x_{off}, y_{off})$ represents the offset motion vector, W represents the width of the current CU, and H represents the height of the current Cu.

If the prediction mode of the collocated subblock S in which the preset position is located is an intra prediction mode or an intra block copy mode, motion information in the ATMVP mode is unavailable.

If the prediction mode of the collocated subblock S in which the preset position is located is an inter prediction mode, the motion information of the collocated subblock S is further extracted, and the coordinates of the preset position are obtained according to the formula (6). Further, motion information of the position in a motion vector field of the collocated picture is used as the motion information of the collocated subblock S, where the motion information of the collocated subblock S is referred to as default motion information of the collocated subblock.

A default motion vector MV of the collocated subblock S is scaled, to obtain a default motion vector (MV) of the to-be-processed subblock, and a scaled motion vector (MV) is used as the default motion information.

For example, as shown in FIG. 10, the scaled MV may be obtained by using a method in a formula (7). A scaling method is not limited herein.

$$MV_s = \dfrac{CurPoc - CurRefPoc}{CurPoc - CurRefPoc} \times MV \quad (7)$$

It is assumed that a POC of a frame in which the current block is located is CurPoc, a POC of a reference frame of the current block is CurRefPoc, a POC of the collocated picture is ColPoc, a POC of a reference frame of the collocated subblock is ColRefPoc, and a to-be-scaled motion vector is MV.

Optionally, the MV is decomposed into a motion vector MVx in a horizontal direction and a motion vector MVy in a vertical direction, and a motion vector MVsx in the horizontal direction and a motion vector MVsy in the vertical direction are separately obtained through calculation according to the foregoing formula.

(It should be understood that the preset position corresponds to only one subblock S, and selecting the collocated subblock S is to determine, based on the prediction mode of the collocated subblock S, whether the ATMVP is available.)

Step 3: Determine motion information of the to-be-processed subblock based on the motion information of the collocated subblock.

As shown in FIG. 11, for each subblock in the current CU, a collocated subblock of the subblock in the collocated picture is determined based on the offset motion vector and position coordinates of the subblock, and motion information of the collocated subblock is obtained.

Position coordinates of a center point of the collocated subblock are obtained according to a formula (8). (x, y) represents coordinates of a top-left corner of the current CU, i represents an $i^{th}$ subblock from left to right, j represents a $j^{th}$ subblock from top to bottom, $(x_{off}, y_{off})$ represents the offset motion vector, M×N represents a size of the subblock (for example, 4×4 or 8×8), and $(x_{(i,j)}, y_{(i,j)})$ represents position coordinates of a corresponding $(i, j)^{th}$ subblock.

$$\begin{cases} x_{(i,j)} = x + M \times i + \dfrac{M}{2} + x_{off} \\ y_{(i,j)} = y + N \times j + \dfrac{N}{2} + y_{off} \end{cases} \quad (8)$$

A prediction mode of the collocated subblock is obtained based on the position coordinates of the center point of the collocated subblock. If the prediction mode of the collocated subblock is the inter prediction mode, the motion information of the collocated subblock is available. In this case, motion information of the position in the motion vector field of the collocated picture is used as the motion information of the collocated subblock. The motion information of the collocated subblock is scaled, to obtain the motion information of the to-be-processed subblock. A scaling method is the same as the method in step 2, and details are not described herein again.

If the prediction mode of the collocated subblock is the intra prediction mode or the intra block copy mode, the motion information of the collocated subblock is unavailable. In this case, the default motion information obtained in step 2 may be used as the motion information of the collocated subblock.

Step 4: Perform motion compensation prediction based on motion information of each subblock, to obtain a predicted pixel value of the current CU.

A motion vector is added to coordinates of a pixel in a top-left corner of each subblock based on the motion information of the subblock, to find a corresponding coordinate point in a reference frame. If the motion vector is in fractional-sample accuracy, interpolation filtering needs to be performed to obtain a predicted pixel value of the subblock. Otherwise, a pixel value in the reference frame is directly obtained and used as a predicted pixel value of the subblock.

The offset motion vector needs to be introduced to determine the availability information that is in the ATMVP mode. This depends on an offset motion vector search process. In addition, when the motion information of the collocated subblock is unavailable, the default motion information needs to be calculated. This affects a coding speed.

Embodiment B

Step 1: Determine an offset motion vector (offset motion vector).

The offset motion vector (offset motion vector) is used to determine a position of a collocated block of a current CU in a collocated picture. A motion vector of a spatially neighboring block of the current CU may be used as the offset motion vector. A reference frame of the spatially neighboring block is used as the collocated picture (collocated picture) of the current CU. A position of the current CU in a collocated picture block is determined based on the offset motion vector and the collocated picture block. A block at the position is referred to as a collocated block (corresponding/collocated block).

A method is the same as that in step 1 in Embodiment A.

Step 2: Obtain motion information of a collocated subblock.

As shown in FIG. 11, the collocated block may be first obtained based on the offset vector, and then a collocated subblock having a relative position relationship with a to-be-processed subblock is determined in a target picture based on a position of the to-be-processed subblock (it may also be understood as that a collocated subblock having a relative position relationship with the to-be-processed subblock is determined in the collocated block).

For each subblock in the current CU, a collocated subblock of the subblock in the collocated picture is determined based on the offset motion vector and position coordinates of the subblock, and motion information of the collocated subblock is obtained.

Position coordinates of a center point of the collocated subblock are obtained according to a formula (9). (x, y) represents coordinates of a top-left corner of the current CU, i represents an $i^{th}$ subblock from left to right, j represents a $j^{th}$ subblock from top to bottom, $(x_{off}, y_{off})$ represents the offset motion vector, M×N represents a size of the subblock (for example, 4×4 or 8×8), and $(x_{(i,j)}, y_{(i,j)})$ represents position coordinates of a corresponding $(i,j)^{th}$ subblock.

$$\begin{cases} x_{(i,j)} = x + M \times i + \dfrac{M}{2} + x_{off} \\ y_{(i,j)} = y + N \times j + \dfrac{N}{2} + y_{off} \end{cases} \quad (9)$$

A prediction mode of the collocated subblock is obtained based on the position coordinates of the center point of the collocated subblock. If the prediction mode of the collocated subblock is an inter prediction mode, the motion information of the collocated subblock is available. In this case, motion information of the position in a motion vector field of the collocated picture is used as the motion information of the collocated subblock. Motion information of the current subblock is derived based on the motion information of the collocated subblock. A motion vector of the collocated subblock is scaled and converted into a motion vector of the subblock. A scaling method in the conventional technology may be used, and details are not described herein.

If the prediction mode of the collocated subblock is an intra prediction mode or an intra block copy mode, the motion information of the collocated subblock is unavailable. In this case, one of the following processing methods may be used.

Method 1: If a type of a picture, a slice, or a tile group in which the subblock of the current CU is located is a B type, a bidirectional zero motion vector is filled in the collocated subblock or the to-be-processed subblock, for example, predFlagL0=1, predFlagL1=1, mvL0=0, and mvL1=0.

Otherwise, a unidirectional list 0 motion vector is filled, for example, predFlagL0=1, predFlagL1=0, mvL0=0, and mvL1=0.

Method 2: Unidirectional list 0 zero motion vector information is filled in the collocated subblock or the to-be-processed subblock, for example, predFlagL0=1, predFlagL1=0, mvL0=0, and mvL1=0.

Method 3: Unidirectional list 1 zero motion vector information is filled in the collocated subblock or the to-be-processed subblock, for example, predFlagL0=0, predFlagL1=1, mvL0=0, and mvL1=0.

predFlagL0 and predFlagL1 respectively represent prediction directions for performing prediction by using a list 0 and a list 1, and mvL0 and mvL1 respectively represent motion vectors used for performing prediction by using the list 0 and the list 1. mvL0=0 represents that both a horizontal component and a vertical component of mvL0 are filled with 0, and mvL1=0 represents that both a horizontal component and a vertical component of mvL1 are 0.

Step 3: Perform motion compensation prediction based on motion information of each subblock, to obtain a predicted pixel value of the current CU.

A motion vector is added to coordinates of a pixel in a top-left corner of each subblock based on the motion information of the subblock, to find a corresponding coordinate point in the reference frame. If the motion vector is in fractional-sample accuracy, interpolation filtering needs to be performed to obtain a predicted pixel value of the subblock. Otherwise, a pixel value in the reference frame is directly obtained and used as a predicted pixel value of the subblock.

Amendments to the document are as follows (for a basis of the amendments, refer to JVET-N1001-v3, for the meaning of the following pseudocode, refer to this document, and this document can be downloaded from the website http://phenix.int-evrv.fr/jvet/):

When availableFlagL0SbCol and availableFlagL1SbCol are both equal to 0, the following applies:

$mvL0SbCol[xSbIdx][ySbIdx][0] = 0$      (8-638)

$mvL0SbCol[xSbIdx][ySbIdx][1] = 0$      (8-638)

$predFlagL0SbCol[xSbIdx][ySbIdx] = 1$      (8-639)

$mvL1SbCol[xSbIdx][ySbIdx][0] = 0$      (8-638)

$mvL1SbCol[xSbIdx][ySbIdx][1] = 0$      (8-638)

$predFlagL1SbCol[xSbIdx][ySbIdx] = $ slice_type $== B\ ?\ 1:0$      (8-639)

$mvL0SbCol[xSbIdx][ySbIdx][0] = 0$      (8-638)

$mvL0SbCol[xSbIdx][ySbIdx][1] = 0$      (8-638)

$predFlagL0SbCol[xSbIdx][ySbIdx] = 1$      (8-639)

$mvL1SbCol[xSbIdx][ySbIdx][0] = 0$      (8-638)

$mvL1SbCol[xSbIdx][ySbIdx][1] = 0$      (8-638)

$predFlagL1SbCol[xSbIdx][ySbIdx] = 0$      (8-639)

According to this embodiment of this application, when the motion information of the collocated subblock is unavailable, a conventional-technology problem that complex start offset motion vector calculation is required, and preset motion information is directly filled, to determine the availability information and the default motion information that are in the ATMVP mode is resolved. This reduces coding complexity.

Embodiment C

This embodiment relates to an inter prediction method, and a method for obtaining an offset motion vector is optimized. Steps 2 and 3 are the same as those in Embodiment A. A description is provided as follows.

Step 1: Determine an offset motion vector (offset motion vector).

The offset motion vector (offset motion vector) is used to determine a position of a collocated block of a current CU in a collocated picture. A motion vector of a spatially neighboring block of the current CU may be used as the offset motion vector. A reference frame of the spatially neighboring block is used as the collocated picture (collocated picture) of the current CU. A position of the current CU in a collocated picture block is determined based on the offset motion vector and the collocated picture block. A block at the position is referred to as a collocated block (corresponding/collocated block).

As shown in FIG. 10, if A1 is available, and a collocated picture to which a motion vector of A1 points is a collocated picture of A1 (that is, a reference picture of A1 is a collocated frame of A1), the motion vector of A1 is used as the offset motion vector of the current CU. The offset motion vector may be obtained by using one of the following methods. If A1 is unavailable, a value of the offset motion vector is 0. That A1 is unavailable means that if a block at the position A1 is not decoded, the block is an intra prediction block or an intra block copy block, or if the block is located outside a current slice (slice), tile, tile group (tile group), or picture, it is considered that the block is an unavailable block.

Method 1: Whether all the following preset conditions are met is determined. If all the preset conditions are met, whether a reference frame corresponding to a list 1 of A1 is the same as a collocated picture of a current frame is checked. If the reference frame corresponding to the list 1 of A1 is the same as the collocated picture of the current frame, a motion vector corresponding to the list 1 is used as the offset motion vector; or if the reference frame corresponding to the list 1 of A1 is different from the collocated picture of the current frame, whether a reference frame corresponding to a list 0 is the same as the collocated picture of the current frame is checked. If the reference frame corresponding to the list 0 is the same as the collocated picture of the current frame, a motion vector corresponding to the list 0 is used as the offset motion vector; otherwise, the offset motion vector is 0.

(1) A low-latency coding structure is used, and only a picture that is displayed before a current picture is used for prediction.

(2) A type of a picture, a tile, or a tile group in which the current block is located is a B type.

(3) collocated_from_l0_flag is 0. collocated_from_l0_flag equal to 1 specifies that a collocated picture for temporal motion vector prediction is obtained from a reference picture queue list 0. collocated_from_l0_flag equal to 0 specifies that a collocated picture for temporal motion vector prediction is obtained from a reference picture queue list 1. A value of collocated_from_l0_flag is 1 when collocated_from_l0_flag is not present in a bitstream.

Otherwise (if the foregoing preset conditions are not met), whether the reference frame corresponding to the list 0 of A1 is the same as the collocated picture of the current frame is first checked. If the reference frame corresponding to the list 0 of A1 is the same as the collocated picture of the current frame, the motion vector corresponding to the list 0 is used as the offset motion vector; or if the reference frame corresponding to the list 0 of A1 is different from the collocated picture of the current frame, whether the reference frame corresponding to the list 1 is the same as the collocated picture of the current frame is checked. If the reference frame corresponding to the list 1 is the same as the collocated picture of the current frame, the motion vector corresponding to the list 1 is used as the offset motion vector; otherwise, the offset motion vector is 0.

Method 2: Whether both the following preset conditions are met is determined. If both the preset conditions are met, whether a reference frame corresponding to a list 1 of A1 is the same as a collocated picture of a current frame is checked. If the reference frame corresponding to the list 1 of A1 is the same as the collocated picture of the current frame, a motion vector corresponding to the list 1 is used as the offset motion vector; or if the reference frame corresponding to the list 1 of A1 is different from the collocated picture of the current frame, whether a reference frame corresponding to a list 0 is the same as the collocated picture of the current frame is checked. If the reference frame corresponding to the list 0 is the same as the collocated picture of the current frame, a motion vector corresponding to the list 0 is used as the offset motion vector; otherwise, the offset motion vector is 0.

(1) A type of a picture, a tile, or a tile group in which the current block is located is a B type.

(2) collocated_from_l0_flag is 0. collocated_from_l0_flag equal to 1 specifies that a collocated picture for temporal motion vector prediction is obtained from a reference picture queue list 0. collocated_from_l0_flag equal to 0 specifies that a collocated picture for temporal motion vector prediction is obtained from a reference picture queue list 1. A value of collocated_from_l0_flag is 1 when collocated_from_l0_flag is not present in a bitstream.

Otherwise (if the foregoing preset conditions are not met), whether the reference frame corresponding to the list 0 of A1 is the same as the collocated picture of the current frame is first checked. If the reference frame corresponding to the list 0 of A1 is the same as the collocated picture of the current frame, the motion vector corresponding to the list 0 is used as the offset motion vector; or if the reference frame corresponding to the list 0 of A1 is different from the collocated picture of the current frame, whether the reference frame corresponding to the list 1 is the same as the collocated picture of the current frame is checked. If the reference frame corresponding to the list 1 is the same as the collocated picture of the current frame, the motion vector corresponding to the list 1 is used as the offset motion vector; otherwise, the offset motion vector is 0.

Method 3: Whether a reference frame corresponding to a list 0 of A1 is the same as a collocated picture of a current frame is first checked. If the reference frame corresponding to the list 0 of A1 is the same as the collocated picture of the current frame, a motion vector corresponding to the list 0 of A1 is used as the offset motion vector. Whether a reference frame corresponding to a list 1 is the same as the collocated picture of the current frame does not need to be checked. If the reference frame corresponding to the list 0 of A1 is different from the collocated picture of the current frame, and a type of a picture, a tile, or a tile group in which the current block is located is a B type, whether the reference frame of the list 1 is the same as the collocated picture of the current frame further needs to be determined. If the reference frame of the list 1 is the same as the collocated picture of the current frame, the motion vector corresponding to the list 1 of A1 may be used as the offset motion vector; otherwise, the offset motion vector is 0.

Method 4: Whether a reference frame corresponding to a list 0 of A1 is the same as a collocated picture of a current frame is checked. If the reference frame corresponding to the list 0 of A1 is the same as the collocated picture of the current frame, a motion vector corresponding to the list 0 of A1 is used as the offset motion vector; otherwise, the offset motion vector is 0.

An index number (idx) of the collocated picture of the current frame of the picture block may be obtained from the bitstream.

It should be understood that the used offset vector may alternatively be a zero offset vector. In this case, a picture block in the collocated picture that is at a same position as the to-be-processed block is a collocated block of the to-be-processed block in the collocated picture. In addition, when a target offset vector that meets a requirement cannot be found, an ATMVP technology may not be used, but another technology is used to obtain a motion vector of a to-be-processed subblock.

Amendments to the document are as follows:

Method 1:
When availableFlagA$_1$ is equal to TRUE, the following applies:
  If all of the following conditions are true, checkL1First is set equal to 1:
    DiffPicOrderCnt(aPic, currPic) is less than or equal to 0 for every picture aPic in every reference picture list of the current slice,
    slice type is equal to B,
    collocated_from_l0_flag is equal to 0.
  K is set equal to checkL1First, and if all of the following conditions are true, tempMV is set equal to mvLKA$_1$:
    predFlagLKA$_1$ is equal to 1,
    DiffPicOrderCnt(ColPic, RefPicList[K][refIdxLKA$_1$]) is equal to 0.
  Otherwise, K is set equal to (1−checkL1First), and if all of the following conditions are true, tempMV is set equal to mvLKA$_1$:
    predFlagLKA$_1$ is equal to 1,
    DiffPicOrderCnt(ColPic, RefPicList[K][refIdxLKA$_1$]) is equal to 0.

Method 2:
When availableFlagA$_1$ is equal to TRUE, the following applies:
  If all of the following conditions are true, checkL1First is set equal to 1:
    slice type is equal to B,
    collocated_from_l0_flag is equal to 0.
  K is set equal to checkL1First, and if all of the following conditions are true, tempMV is set equal to mvLKA$_1$:
    predFlagLKA$_1$ is equal to 1,
    DiffPicOrderCnt(ColPic, RefPicList[K][refIdxLKA$_1$]) is equal to 0.
  Otherwise, K is set equal to (1−checkL1First), and if all of the following conditions are true, tempMV is set equal to mvLKA$_1$:
    predFlagLKA$_1$ is equal to 1,
    DiffPicOrderCnt(ColPic, RefPicList[K][refIdxLKA$_1$]) is equal to 0.

Method 3:
When availableFlagA$_1$ is equal to TRUE, the following applies:
  If all of the following conditions are true, tempMV is set equal to mvL0A$_1$:
    predFlagL0A$_1$ is equal to 1,
    DiffPicOrderCnt(ColPic, RefPicList[0][refIdxL0A$_1$]) is equal to 0.
  Otherwise, if all of the following conditions are true, tempMV is set equal to mvL1A$_1$:
    slice type is equal to B,
    predFlagL1A$_1$ is equal to 1,
    DiffPicOrderCnt(ColPic, RefPicList[1][refIdxL1A$_1$]) is equal to 0.

Method 4:
When availableFlagA$_1$ is equal to TRUE, the following applies:
  If all of the following conditions are true, tempMV is set equal to mvL0A$_1$:
    predFlagL0A$_1$ is equal to 1,
    DiffPicOrderCnt(ColPic, RefPicList[0][refIdxL0A$_1$]) is equal to 0.

Embodiments of this application provide a new offset motion vector calculation method, to reduce coding complexity and increase coding efficiency.

A person skilled in the art can understand that, the functions described with reference to various illustrative logical blocks, modules, and algorithm steps disclosed and described in this specification can be implemented by using hardware, software, firmware, or any combination thereof. If software is used for implementation, the functions described with reference to the illustrative logical blocks, modules, and steps may be stored in or transmitted over a computer-readable medium as one or more instructions or code and executed by a hardware-based processing unit. The computer-readable medium may include a computer-readable storage medium. The computer-readable storage medium corresponds to a tangible medium such as a data storage medium, or a communications medium including any medium that facilitates transfer of a computer program from one place to another place (for example, according to a communications protocol). In this manner, the computer-readable medium may be generally corresponding to: (1) a non-transitory tangible computer-readable storage medium, or (2) a communications medium such as a signal or a carrier. The data storage medium may be any usable medium that can be accessed by one or more computers or one or more processors to retrieve instructions, code, and/or data structures for implementing the technologies described in this application. A computer program product may include the computer-readable medium.

By way of example but not limitation, such computer-readable storage medium may include a RAM, a ROM, an EEPROM, a CD-ROM or another optical disc storage apparatus, a magnetic disk storage apparatus or another magnetic storage apparatus, a flash memory, or any other medium that can be used to store desired program code in a form of an instruction or a data structure and that can be accessed by a computer. In addition, any connection is properly referred to as a computer-readable medium. For example, if instructions are transmitted from a website, a server, or another remote source through a coaxial cable, an optical fiber, a twisted pair, a digital subscriber line (DSL), or wireless technologies such as infrared, radio, and microwave, the coaxial cable, the optical fiber, the twisted pair, the DSL, or the wireless technologies such as infrared, radio, and microwave are included in a definition of the medium. However, it should be understood that the computer-readable storage medium and the data storage medium do not include connections, carriers, signals, or other transitory media, but actually mean non-transitory tangible storage media. Disks and discs used in this specification include a compact disc (CD), a laser disc, an optical disc, a digital versatile disc (DVD), and a Blu-ray disc. The disks usually reproduce data magnetically, whereas the discs reproduce data optically with lasers. Combinations of the foregoing items should also be included in the scope of the computer-readable medium.

Instructions may be executed by one or more processors such as one or more digital signal processors (DSPs), general-purpose microprocessors, application-specific integrated circuits (ASICs), field programmable gate arrays (FPGAs), or other equivalent integrated circuits or discrete logic circuits. Therefore, the term "processor" used in this specification may refer to the foregoing structure, or any other structure suitable for implementing the technologies described in this specification. In addition, in some aspects, the functions described with reference to the illustrative logical blocks, modules, and steps described in this specification may be provided within dedicated hardware and/or software modules configured for encoding and decoding, or may be incorporated into a combined codec. In addition, the technologies may be all implemented in one or more circuits or logic elements.

The technologies in this application may be implemented in various apparatuses or devices, including a wireless handset, an integrated circuit (IC), or a set of ICs (for example, a chip set). Various components, modules, or units are described in this application to emphasize functional aspects of the apparatuses configured to perform the disclosed technologies, but are not necessarily implemented by using different hardware units. Actually, as described above, various units may be combined into a codec hardware unit in combination with appropriate software and/or firmware, or may be provided by interoperable hardware units (including one or more processors described above).

In the foregoing embodiments, the descriptions of the embodiments have respective focuses. For a part that is not described in detail in an embodiment, refer to related descriptions in other embodiments.

The foregoing descriptions are merely specific example implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

The invention claimed is:

1. A video image encoding method performed by a video encoder, comprising:
   determining a temporal offset vector of a to-be-processed block based on a spatially neighboring block of the to-be-processed block, wherein the to-be-processed block comprises one or more subblocks and the temporal offset vector is used to determine a collocated subblock of a subblock of the to-be-processed block;
   determining whether a motion vector corresponding to a preset intra-block position of the collocated subblock is available;
   performing scaling processing on the motion vector corresponding to the preset intra-block position of the collocated subblock to obtain a motion vector of the subblock of the one or more subblocks of the to-be-processed block based on a ratio of a first temporal distance difference to a second temporal distance difference, the performing being in response to the motion vector corresponding to the preset intra-block position of the collocated subblock being available, wherein the first temporal distance difference is a picture order count difference between an image frame in which the to-be-processed block is located and a reference frame of the to-be-processed block, and the second temporal distance difference is a picture order count difference between an image frame in which the collocated subblock is located and a reference frame of the collocated subblock;
   performing motion compensation based on the motion vector of the subblock of the to-be-processed block to obtain predicted pixel values of the subblock of the to-be-processed block;
   obtaining residual information according to pixel values of the to-be-processed block and predicted pixel values of the to-be-processed block, wherein the predicted pixel values of the to-be-processed block comprises predicted pixel values of the one or more subblocks of the to-be-processed block; and
   performing transformation, quantization, and entropy encoding on the residual information to obtain an encoded bitstream.

2. The method of claim 1, wherein an index of the reference frame of the to-be-processed block in a reference frame list of the to-be-processed block is 0.

3. The method of claim 1, further comprises:
   in response to the motion vector corresponding to the preset intra-block position being unavailable, obtaining the motion vector of the subblock of the to-be-processed block based on a first preset motion vector.

4. The method of claim 3, wherein the first preset motion vector is a zero motion vector.

5. The method of claim 1, wherein the determining whether the motion vector corresponding to the preset intra-block position of the collocated subblock is available comprises:
   determining whether the motion vector corresponding to the preset intra-block position of the collocated subblock is available according to a prediction mode of the collocated subblock.

6. The method of claim 5, wherein the determining whether the motion vector corresponding to the preset intra-block position of the collocated subblock is available according to the prediction mode of the collocated subblock comprises:
   determining the motion vector corresponding to the preset intra-block position of the collocated subblock is unavailable when the prediction mode of the collocated subblock is an intra prediction mode or an intra block copy mode.

7. A video image encoding apparatus, comprising:
   a memory storing instructions; and
   at least one processor in communication with the memory, the at least one processor configured, upon execution of the instructions, to perform the following steps:
   determine a temporal offset vector of a to-be-processed block based on a spatially neighboring block of the to-be-processed block, wherein the to-be-processed block comprises one or more subblocks and the temporal offset vector is used to determine a collocated subblock of a subblock of the to-be-processed block;
   determine whether a motion vector corresponding to a preset intra-block position of the collocated subblock is available;
   perform scaling processing on the motion vector corresponding to the preset intra-block position of the collocated subblock to obtain a motion vector of the subblock of the one or more subblocks of the to-be-processed block based on a ratio of a first temporal distance difference to a second temporal distance difference, the performing being in response to the motion vector corresponding to the preset intra-block position of the collocated subblock being available, wherein the first temporal distance difference is a picture order count difference between an image frame in which the to-be-processed block is located and a reference frame of the to-be-processed block, and the second temporal distance difference is a picture order count difference between an image frame in which the collocated subblock is located and a reference frame of the collocated subblock;

perform motion compensation based on the motion vector of the subblock of the to-be-processed block to obtain predicted pixel values of the subblock of the to-be-processed block;

obtain residual information according to pixel values of the to-be-processed block and predicted pixel values of the to-be-processed block, wherein the predicted pixel values of the to-be-processed block comprises the predicted pixel values of the one or more subblocks of the to-be-processed block; and perform transformation, quantization, and entropy encoding on the residual information to obtain an encoded bitstream.

8. The video image encoding apparatus of claim 7, wherein an index of the reference frame of the to-be-processed block in a reference frame list of the to-be-processed block is 0.

9. The video image encoding apparatus of claim 7, further comprises:

in response to the motion vector corresponding to the preset intra-block position being unavailable, obtain the motion vector of the subblock of the to-be-processed block based on a first preset motion vector.

10. The video image encoding apparatus of claim 9, wherein the first preset motion vector is a zero motion vector.

11. The video image encoding apparatus of claim 7, wherein instructions, when executed by the at least one processor, cause the at least one processor to:

determine whether the motion vector corresponding to the preset intra-block position of the collocated subblock is available according to a prediction mode of the collocated subblock.

12. The video image encoding apparatus of claim 11, wherein instructions, when executed by the at least one processor, cause the at least one processor to:

determine the motion vector corresponding to the preset intra-block position of the collocated subblock is unavailable when the prediction mode of the collocated subblock is an intra prediction mode or an intra block copy mode.

13. A non-transitory computer-readable media storing computer instructions that configure at least one processor, upon execution of the instructions, to perform the following steps:

determining a temporal offset vector of a to-be-processed block based on a spatially neighboring block of the to-be-processed block, wherein the to-be-processed block comprises one or more subblocks and the temporal offset vector is used to determine a collocated subblock of a subblock of the to-be-processed block;

determining whether a motion vector corresponding to a preset intra-block position of the collocated subblock is available;

performing scaling processing on the motion vector corresponding to the preset intra-block position of the collocated subblock to obtain a motion vector of the subblock of the one or more subblocks of the to-be-processed block based on a ratio of a first temporal distance difference to a second temporal distance difference, the performing being in response to the motion vector corresponding to the preset intra-block position of the collocated subblock being available, wherein the first temporal distance difference is a picture order count difference between an image frame in which the to-be-processed block is located and a reference frame of the to-be-processed block, and the second temporal distance difference is a picture order count difference between an image frame in which the collocated subblock is located and a reference frame of the collocated subblock;

performing motion compensation based on the motion vector of the subblock of the to-be-processed block to obtain predicted pixel values of the subblock of the to-be-processed block;

obtaining residual information according to pixel values of the to-be-processed block and predicted pixel values of the to-be-processed block, wherein the predicted pixel values of the to-be-processed block comprises the predicted pixel values of the one or more subblocks of the to-be-processed block; and performing transformation, quantization, and entropy encoding on the residual information to obtain an encoded bitstream.

14. The non-transitory computer-readable storage medium of claim 13, wherein an index of the reference frame of the to-be-processed block in a reference frame list of the to-be-processed block is 0.

15. The non-transitory computer-readable storage medium of claim 13, further comprises:

in response to the motion vector corresponding to the preset intra-block position being unavailable, obtaining the motion vector of the subblock of the to-be-processed block based on a first preset motion vector.

16. The non-transitory computer-readable storage medium of claim 15, wherein the first preset motion vector is a zero motion vector.

17. The non-transitory computer-readable storage medium of claim 13, wherein the determining whether the motion vector corresponding to the preset intra-block position of the collocated subblock is available comprises:

determining whether the motion vector corresponding to the preset intra-block position of the collocated subblock is available according to a prediction mode of the collocated subblock.

18. The non-transitory computer-readable storage medium of claim 17, wherein the determining whether the motion vector corresponding to the preset intra-block position of the collocated subblock is available according to the prediction mode of the collocated subblock comprises:

determining the motion vector corresponding to the preset intra-block position of the collocated subblock is unavailable when the prediction mode of the collocated subblock is an intra prediction mode or an intra block copy mode.

* * * * *